(12) United States Patent
Wang et al.

(10) Patent No.: US 12,300,831 B2
(45) Date of Patent: May 13, 2025

(54) BRACKET, BATTERY ASSEMBLY, ELECTRIC APPARATUS, AND PREPARATION METHOD AND DEVICE OF BATTERY ASSEMBLY

(71) Applicant: CONTEMPORARY AMPEREX TECHNOLOGY (HONG KONG) LIMITED, Hong Kong (CN)

(72) Inventors: Kangyu Wang, Ningde (CN); Mu Qian, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 686 days.

(21) Appl. No.: 17/533,449

(22) Filed: Nov. 23, 2021

(65) Prior Publication Data

US 2022/0102800 A1      Mar. 31, 2022

Related U.S. Application Data

(63) Continuation of application No. PCT/CN2020/119724, filed on Sep. 30, 2020.

(51) Int. Cl.
*H01M 50/209* (2021.01)
*H01M 50/249* (2021.01)

(52) U.S. Cl.
CPC ....... *H01M 50/209* (2021.01); *H01M 50/249* (2021.01); *H01M 2220/20* (2013.01)

(58) Field of Classification Search
CPC ............. H01M 50/209; H01M 50/249; H01M 2220/20; H01M 50/204; H01M 50/244;
(Continued)

(56) References Cited

U.S. PATENT DOCUMENTS

2017/0244073 A1   8/2017  Yusa et al.
2020/0112004 A1*  4/2020  Yu .......................... H01M 50/50
(Continued)

FOREIGN PATENT DOCUMENTS

CN    205016594 U    2/2016
CN    106099002 A    11/2016
(Continued)

OTHER PUBLICATIONS

Second Office Action dated Oct. 19, 2023 received in Chinese Patent Application No. CN 202080097853.5.
(Continued)

*Primary Examiner* — Daniel S Gatewood
(74) *Attorney, Agent, or Firm* — Scully, Scott, Murphy & Presser, P.C.

(57) ABSTRACT

The present application provides a bracket, a battery assembly, an electric apparatus, and a preparation method and device of the battery assembly, and relates to the field of batteries. The bracket is configured to be connected to a battery and an electric apparatus body; the battery includes a first connector for outputting electric energy; and the bracket includes a bracket body and a second connector. The bracket body is configured to fix the battery. The second connector is mounted on the bracket body; and a connecting end of the second connector faces towards a gravity direction, so that the first connector can be butted with the second connector along the opposite direction of the gravity direction, thereby realizing electric connection between the first connector and the second connector. Such a structure will not damage the first connector and/or the second connector due to the gravity of the battery.

18 Claims, 11 Drawing Sheets

(58) Field of Classification Search
CPC ............. H01M 50/264; H01M 50/503; H01M 50/517; H01M 50/296; Y02E 60/10
See application file for complete search history.

(56) References Cited

U.S. PATENT DOCUMENTS

2020/0161597 A1    5/2020  Ruan
2022/0109311 A1    4/2022  Zhang et al.

FOREIGN PATENT DOCUMENTS

| | | | |
|---|---|---|---|
| CN | 205828453 | U | 12/2016 |
| CN | 107579172 | A | 1/2018 |
| CN | 207542287 | U | 6/2018 |
| CN | 109449676 | A | 3/2019 |
| CN | 110466386 | A * | 11/2019 |
| CN | 110800129 | A | 2/2020 |
| CN | 111033790 | A | 4/2020 |
| CN | 111192983 | A | 5/2020 |
| EP | 2280436 | A2 | 2/2011 |
| WO | 2019039422 | A1 | 2/2019 |
| WO | 2019129285 | A1 | 7/2019 |
| WO | 2020026963 | A1 | 2/2020 |
| WO | 2020043118 | A1 | 3/2020 |

OTHER PUBLICATIONS

Second Office Action dated Jul. 29, 2023 received in Chinese Patent Application No. CN 202080097853.5.
Extended European Search Report dated Jul. 12, 2022 received in European Patent Application No. EP 20936080.9.
Office Action dated Oct. 22, 2024 received in European Patent Application No. 20936080.9.

* cited by examiner

BRACKET, BATTERY ASSEMBLY, ELECTRIC APPARATUS, AND PREPARATION METHOD AND DEVICE OF BATTERY ASSEMBLY

CROSS-REFERENCE TO RELATED APPLICATIONS

This application is a continuation of International Application No. PCT/CN2020/119724, filed on Sep. 30, 2020, the disclosure of which is hereby incorporated by reference in its entirety.

TECHNOLOGY FIELD

The present application relates to the field of batteries, and in particular, to a bracket, a battery assembly, an electric apparatus, and a preparation method and device of the battery assembly.

BACKGROUND

Energy saving and emission reduction are the key to the sustainable development of automobile industry. In this case, electric vehicles have become an important part for the sustainable development of the automobile industry due to their advantages of energy saving and environmental protection.

At present, a battery is directly mounted on a vehicle. The battery is inconvenient to disassemble when needing to be maintained or changed. For the convenience of battery disassembly, a bracket is mounted on the vehicle, electric energy of the battery is transmitted to the vehicle through a connector on the bracket, but the stable electric connection relationship between the bracket and the battery is very important for normal operation of the vehicle. However, electric connection between the bracket and the battery is often damaged. The vehicle cannot be used once the electric connection is damaged.

SUMMARY

An embodiment of the present application provides a bracket, a battery assembly, an electric apparatus, and a preparation method and device of the battery assembly, so as to improve the problem that the battery of the vehicle is inconvenient to disassemble and assemble at present.

According to a first aspect, an embodiment of the present application provides a bracket. The bracket is configured to be connected to a battery and an electric apparatus body; the battery includes a first connector for outputting electric energy; and the bracket includes a bracket body and a second connector. The bracket body is configured to fix the battery. The second connector is mounted on the bracket body; and a connecting end of the second connector faces towards a gravity direction, so that the first connector can be butted with the second connector along the opposite direction of the gravity direction, thereby realizing electric connection between the first connector and the second connector.

In the above technical solution, the connecting end of the second connector faces towards the gravity direction, and the first connector on the battery is butted with the second connector along the opposite direction of the gravity direction, so that damage to the first connector and/or the second connector caused by the gravity of the battery is avoided, thereby preventing the influence on the use of the battery or the electric apparatus. In the process of mounting the battery, the first connector can be butted with the second connector only by pushing the battery to move along the opposite direction of the gravity, which is convenient and fast.

In addition, the bracket according to the embodiment in the first aspect of the present application has the following additional technical features:

In some embodiments of the first aspect of the present application, the connecting end of the second connector includes a terminal, where the terminal is configured to be butted with the first connector, so that electric connection between the terminal and the first connector is realized, and the terminal extends in the gravity direction.

In the above technical solution, an extension direction of the terminal is consistent with a butting direction of the first connector and the second connector, thereby avoiding the influence on the lead performance between the first connector and the second connector and the electric safety performance of the electric apparatus caused by bending, even breakage of the terminal due to inconsistency between the extension direction of the terminal and the butting direction in the butting process of the first connector and the second connector.

In some embodiments of the first aspect of the present application, the second connector further includes a base, a first lead and a second lead; the connecting end of the second connector is fixed on the base; the terminal includes a first terminal and a second terminal with opposite polarities; one end of the first lead is connected to the first terminal; one end of the second lead is connected to the second terminal; and the first lead and the second lead respectively stretch out towards two opposite sides of the base in a first direction, the first direction being perpendicular to the gravity direction.

In the above technical solution, the first lead and the second lead stretch out of the base in opposite directions, thereby reducing the risk of shortcircuit between the first lead and the second lead, and improving the safety performance of the electric apparatus.

In some embodiments of the first aspect of the present application, the first lead and the second lead are at least partially located in the base; a first wire outlet hole and a second wire outlet hole are formed in the two opposite sides of the base in the first direction respectively; the first lead stretches out of the first wire outlet hole; and the second lead stretches out of the second wire outlet hole.

In the above technical solution, the first wire outlet hole and the second wire outlet hole are provided, and the first lead and the second lead are separated and limited in respective spaces, so that the risk of shortcircuit between the first lead and the second lead is further reduced, and the safety performance of the electric apparatus is improved. Furthermore, the first wire outlet hole and the second wire outlet hole enable the first lead and the second lead to extend in a preset direction.

In some embodiments of the first aspect of the present application, a center line of the first wire outlet hole coincide with a center line of the second wire outlet hole.

In the above technical solution, the center line of the first wire outlet hole coincide with the center line of the second wire outlet hole, so that the structure of the second connector is symmetrical or tends to be symmetrical, manufacturing is facilitated and high spatial adaptability is achieved.

In some embodiments of the first aspect of the present application, the first terminal and the second terminal are arranged at intervals in the first direction.

In the above technical solution, the first terminal and the second terminal are arranged at intervals, so that there is a certain distance between the two terminals with opposite polarities, thereby reducing the risk of shortcircuit between the first lead and the second lead, and improving the safety performance of the electric apparatus.

In some embodiments of the first aspect of the present application, a size of the base in the first direction is greater than that of the base in a second direction, and the first direction, the second direction and the gravity direction are perpendicular to each other.

In the above technical solution, the size of the base in the first direction is larger and favorable for arrangement of mounting and extending routes of the first lead and the second lead, and the size in the first direction is greater than the size in the second direction, so that the size of the base in the second direction is smaller, thereby reducing the space occupied by the bracket and the weight of the bracket, and avoiding the burden of structural size and weight on the electric apparatus by the arrangement of the bracket.

In some embodiments of the first aspect of the present application, the second connector is mounted on the bracket body in a floating manner.

In the above technical solution, the second connector is mounted on the bracket body in a floating manner, thereby avoiding the situation that the first connector cannot cooperate with the second connector accurately in place due to manufacturing or mounting errors in the butting process with the second connector.

In some embodiments of the first aspect of the present application, the bracket body includes a first beam, a second beam and a fixing frame, where the first beam and the second beam are arranged oppositely; an accommodating space for accommodating a battery is formed between the first beam and the second beam; the fixing frame is connected to the first beam and/or the second beam; and the second connector is mounted on the fixing frame.

In the above technical solution, the first beam and the second beam are configured to form an accommodating space for accommodating the battery, and the fixing frame is configured to be mounted on the second connector, so that the first connector can be butted with the second connector conveniently in the opposite direction of the gravity.

In some embodiments of the first aspect of the present application, the fixing frame is U-shaped, and two ends of the fixing frame are connected to the first beam and the second beam respectively.

In the above technical solution, the U-shaped fixing frame makes the structure of the bracket more stable.

In some embodiments of the first aspect of the present application, the bracket body further includes at least one third beam, where each third beam is connected to the first beam and the second beam.

In the above technical solution, the arrangement of the third beam makes the structural stability of the bracket body higher, thereby facilitating stable mounting of the battery.

In some embodiments of the first aspect of the present application, there are two first beams; the two first beams are arranged oppositely; and the second beam is located between the two first beams, so that the bracket forms two accommodating spaces, where each accommodating space is correspondingly provided with at least one second connector.

In the above technical solution, the bracket body forms a plurality of accommodating spaces by arranging the second beam between the two first beams and can accommodate a plurality of batteries, and the plurality of batteries may provide sufficient electric energy for the electric apparatus, so that normal work of the electric apparatus is ensured, or one of the plurality of batteries serves as a spare power supply of other batteries, and the electric apparatus can work continuously and stably for a long time.

In some embodiments of the first aspect of the present application, the bracket further includes: a locking mechanism; and the locking mechanism is mounted on bracket body and is configured to lock the battery in the bracket body.

In the above technical solution, the electric apparatus may vibrate or suffer impact in the working process, and the arrangement of the locking mechanism enables the battery to be stably mounted on the bracket body and stably supply power for the electric apparatus in a case that the electric apparatus vibrates and suffers from impact.

In some embodiments of the first aspect of the present application, the battery is provided with a locking portion, the bracket body is provided with a channel extending in the gravity direction, and the channel extends to a lower surface of the bracket body, so that the locking portion can enter and exit the channel; the locking mechanism is configured to lock the locking portion when the locking portion moves upwards to a predetermined position of the channel; and the locking mechanism is configured to unlock the locking portion, so that the locking portion moves downwards under the gravity action of the battery to be separated from the channel.

In the above technical solution, the extension direction of the channel is consistent with the gravity direction. In the process that the first connector is butted with the second connector in the opposite direction of the gravity direction, the locking mechanism can lock the battery on the bracket body without other operations, so that the manner and process of mounting and locking the battery are simple.

According to a second aspect, an embodiment of the present application provides a battery assembly, including a battery and the bracket provided by the embodiment of the first aspect, where the bracket is configured to be mounted on an electric apparatus body, the battery is mounted on the bracket, and the battery includes a first connector.

In the above technical solution, the battery is connected to the electric apparatus through the bracket. The bracket can provide a reasonable mounting space for battery mounting, and also can be prevented from being directly connected to the electric apparatus body.

In some embodiments of the second aspect of the present application, the first connector includes a first guide portion; the second connector includes a second guide portion; and the second guide portion is configured to cooperate with the first guide portion so as to guide the second connector to be aligned with the position of the first connector when the second connector is butted with the first connector.

In the above technical solution, the first guide portion cooperates with the second guide portion to guide the first connector to be butted with the second connector, so that the butting accuracy of the first connector and the second connector can be improved.

In some embodiments of the second aspect of the present application, one of the first guide portion and the second guide portion is a guide sleeve, and the other one is a guide column.

In some embodiments of the second aspect of the present application, the battery assembly further includes: a first sealing piece, where when the second guide portion cooperates with the first guide portion in place, the first guide portion and the second guide portion are sealed through the first sealing piece.

In the above technical solution, the first sealing piece is arranged between the first guide portion and the second guide portion, thereby avoiding the influence on the positioning and guide performance of the first guide portion and the second guide portion caused by the fact that dust, water and other impurities enter between the first guide portion and the second guide portion.

In some embodiments of the second aspect of the present application, one of the first guide portion and the second guide portion is a guide sleeve, and the other one is a guide column.

The battery assembly further includes: a first sealing piece, where when the guide sleeve cooperates with the guide column in place, an end face of the guide sleeve and the connector where the guide column is located are sealed through the first sealing piece.

In the above technical solution, the first sealing piece is configured to seal the end face of the guide sleeve and the base of the second connector after the first connector is butted with the second connector, thereby preventing dust, water and other impurities from entering the guide sleeve and the guide column, avoiding damage to the guide sleeve and the guide column and avoiding the influence on the positioning and guide performance of the guide column and the guide sleeve.

In some embodiments of the second aspect of the present application, when the guide sleeve cooperates with the guide column in place, the connecting end of the connector where the guide sleeve is located is sleeved on the connecting end of the connector where the guide column is located, and an end face of the connecting end of the connector where the guide sleeve is located and the connector where the guide column is located are sealed through the first sealing piece.

In the above technical solution, the connecting end of the first connector and the connecting end of the second connector are hermetically connected, thereby preventing fluid or solid particles from entering between the first connector and the second connector from a butting gap of the first connector and the second connector, and preventing external impurities such as dust and water from entering between the first connector and the second connector so as to avoid the influence on the electric connection performance and the safety performance of the first connector and the second connector. The first guide portion and the second guide portion are hermetically connected, and the connecting end of the first connector and the connecting end of the second connector share a sealing structure, so that the number of the sealing structures of the battery assembly can be reduced and the sealing connection of the battery assembly has continuity, thereby further ensuring the sealing effect.

In some embodiments of the second aspect of the present application, the battery assembly further includes: a second sealing piece, where when the first connector cooperates with the second connector in place, the connecting end of the first connector and the connecting end of the second connector are sealed through the second sealing piece.

In the above technical solution, the arrangement of the second sealing piece further improves the sealing property between the connecting end of the first connector and the connecting end of the second connector.

In some embodiments of the second aspect of the present application, the connecting end of the first connector is sleeved on the connecting end of the second connector, and the second sealing piece is arranged between an internal peripheral surface of the connecting end of the first connector and an external peripheral surface of the connecting end of the second connector; or the connecting end of the second connector is sleeved on the connecting end of the first connector, and the second sealing piece is arranged between an internal peripheral surface of the connecting end of the second connector and an external peripheral surface of the connecting end of the first connector.

In the above technical solution, the second sealing piece is arranged between the internal peripheral surface of the connecting end of the first connector and the external peripheral surface of the connecting end of the second connector, or the second sealing piece is arranged between the internal peripheral surface of the connecting end of the second connector and the external peripheral surface of the connecting end of the first connector, so the second sealing piece can provide a radial abutting force for the internal peripheral surface and the external peripheral surface which are in contact with the second sealing piece, thereby enabling the first connector to be butted with the second connector more firmly and reliably while ensuring the sealing property.

According to a third aspect, an embodiment of the present application provides an electric apparatus, including an electric apparatus body and the battery assembly provided by the embodiment of the second aspect, where a bracket of the battery assembly is mounted on the electric apparatus body.

In the above technical solution, the electric apparatus is connected to the battery through the bracket. The bracket can provide a reasonable mounting space for battery mounting, and also can be prevented from being directly connected to the electric apparatus body.

According to a fourth aspect, an embodiment of the present application provides a preparation method of a battery assembly. The preparation method includes:

providing a bracket body; providing a second connector; providing a battery, wherein the battery includes a first connector; mounting the second connector on the bracket body, where a connecting end of the second connector faces towards a gravity direction, so that the first connector is capable of being butted with the second connector along the opposite direction of the gravity direction, thereby realizing electric connection between the first connector and the second connector; and mounting the battery on the bracket body, so that the first connector is electrically connected to the second connector.

According to a fifth aspect, an embodiment of the present application provides a preparation device of a battery assembly. The preparation device includes:

a providing module, configured to: provide a bracket body, provide a second connector, and provide a battery, where the battery includes a first connector; and a mounting module, configured to: mount the second connector on the bracket body, where a connecting end of the second connector faces towards a gravity direction, so that the first connector is capable of being butted with the second connector along the opposite direction of the gravity direction, thereby realizing electric connection between the first connector and the second connector, and mount the battery on the bracket body, so that the first connector is electrically connected to the second connector.

BRIEF DESCRIPTION OF DRAWINGS

In order to describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may also derive other drawings from these accompanying drawings without creative efforts.

Figure 1:
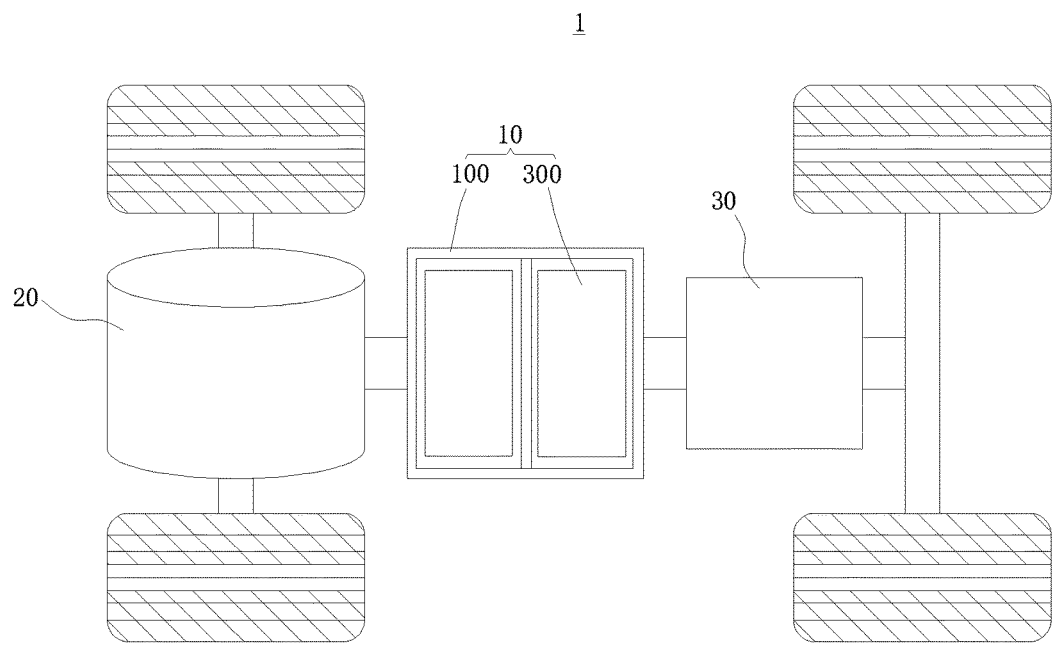
FIG. 1 is a schematic diagram of an electric apparatus according to one embodiment of the present application.

In the accompanying drawings, the accompanying drawings are not drawn according to an actual ratio.

DESCRIPTION OF EMBODIMENTS

The implementations of the present application are described in more detail below with reference to the accompanying drawings and embodiments. The following detailed description of the embodiments and the accompanying drawings are configured to exemplarily describe the principle of the present application, but cannot be configured to limit the scope of the present application, that is, the present application is not limited to the described embodiments.

In the description of the present application, it should be noted that "a plurality" means more than two; orientations or position relationships indicated by terms "upper", "lower", "left", "right", "inner", "outer", etc. are only configured to facilitate description of the present application and simplify the description, but not to indicate or imply that the mentioned device or elements must have a specific orientation and must be constructed and operated in a specific orientation, and thus, these terms cannot be understood as a limitation to the present application. Moreover, terms like "first", "second", "third" and the like are only used for description, and cannot be understood as indicating or implying relative importance. "Perpendicular" is not strictly perpendicular, but within the allowable range of error. "Parallel" is not strictly parallel, but within the allowable range of error.

Orientation words appearing the following description are all directions shown in the drawings, and do not limit a specific structure of the present application.

In the description of the present application, it should also be noted that unless otherwise specified and limited, the terms "mounting", "connecting" and "connection" should be understood in a broad sense, for example, they may be fixed connection and may also be detachable connection or integrated connection; and they may be direction connection and may also be indirect connection through an intermediate medium. A person of ordinary skill in the art may understand specific meanings of the above-mentioned terms in the present application based on the specific situation.

"A plurality of" in the present application refers to more than two (including two). Similarly, "multiple groups" refers to more than two groups (including two groups), and "multiple pieces" refers to more than two pieces (including two pieces).

The battery mentioned in the embodiments of the present application refers to a single physical module including one or more battery cells to provide higher voltage and capacity. For example, the batter mentioned in the present application may include a battery module or a battery pack. The battery generally includes a box body for packaging one or more battery cells. The box body may prevent liquid or other foreign matters from affecting charging or discharging of the battery cell.

In the prior art, a vehicle will vibrate in the running process, resulting in loose connection between the battery and the bracket, so that the position of the battery in a height direction will change, and the gravity of the battery will apply an additional force to an electric connection position of the battery and the bracket, thereby causing ineffective electric connection and affecting the use of the vehicle.

The technical solutions described in the embodiments of the present application are all suitable for various devices using batteries, such as a mobile phone, portable equipment, a notebook computer, an electromobile, an electric toy, an electric tool, an electric vehicle, a ship, spacecraft and the like. For example, the spacecraft includes an airplane, a rocket, a space shuttle, a spaceship and the like.

It should be understood that the technical solutions described in the embodiments of the present application are not only suitable for the above described equipment, but also suitable for all equipment using the battery. However, for simple description, the following embodiments are described by taking the electric vehicle as an example.

In one embodiment of the present application, an electric apparatus 1 is a vehicle. As shown in FIG. 1 which is a structural schematic diagram of a vehicle according to one embodiment of the present application, the vehicle may be a fuel vehicle, a gas vehicle or a new energy vehicle, where the new energy vehicle may be a battery electric vehicle, a hybrid electric vehicle or an extended-range vehicle. The vehicle may be internally provided with a motor 20, a controller 30 and a battery 300, where the controller 30 is configured to control the battery 300 to supply power for the motor 20. For example, the battery 300 may be arranged at the bottom or head or tail of the vehicle. The battery 300 may be configured to supply power for the vehicle. For example, the battery 300 may serve as an operating power supply of the vehicle and may be applied to a circuit system of the vehicle, for example, the battery 300 may be applied to the working power requirements during starting, navigation and operation of the vehicle. In another embodiment of the present application, the battery 300 not only may serve as an operating power supply of the vehicle, but also may serve as a driving power supply of the vehicle to replace or partially replace fuel oil or natural gas to provide driving power for the vehicle.

An embodiment of the present application provides an electric apparatus 1 using a battery 300 as a power supply. The electric apparatus 1 includes an electric apparatus body and a battery assembly 10, where the battery assembly 10 includes a bracket 100 and a battery 300. The bracket 100 is mounted on the electric apparatus body, and the battery 300 is mounted on the bracket 100.

In some embodiments of the present application, the electric apparatus 1 is a vehicle, the electric apparatus body is a vehicle body, and the bracket 100 of the battery assembly 10 is connected to the bottom of the vehicle body.

Figure 2:
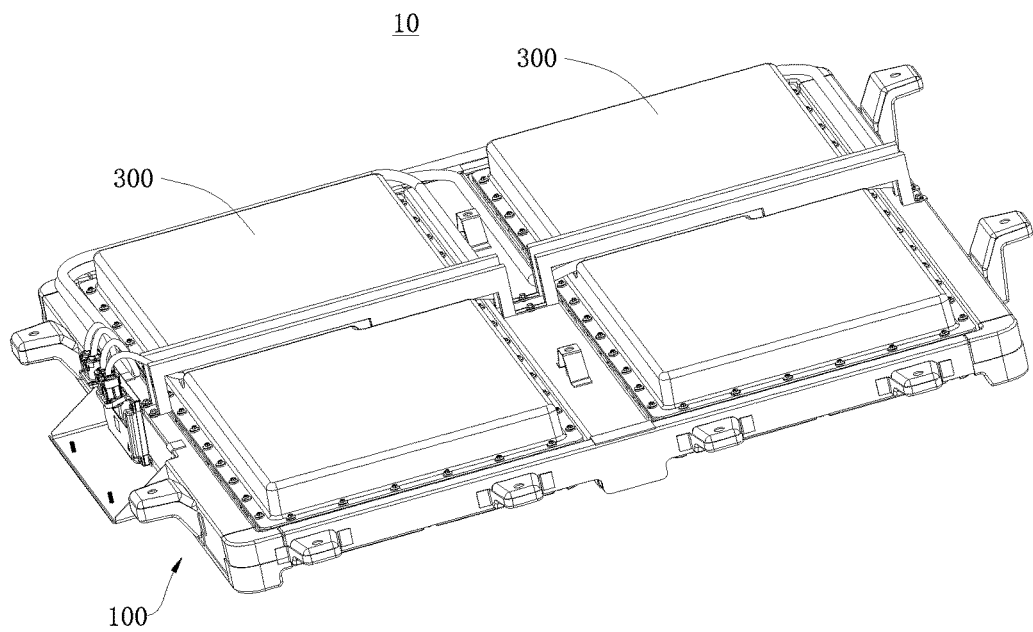
FIG. 2 is a schematic diagram of a battery assembly according to one embodiment of the present application.
Figure 3:
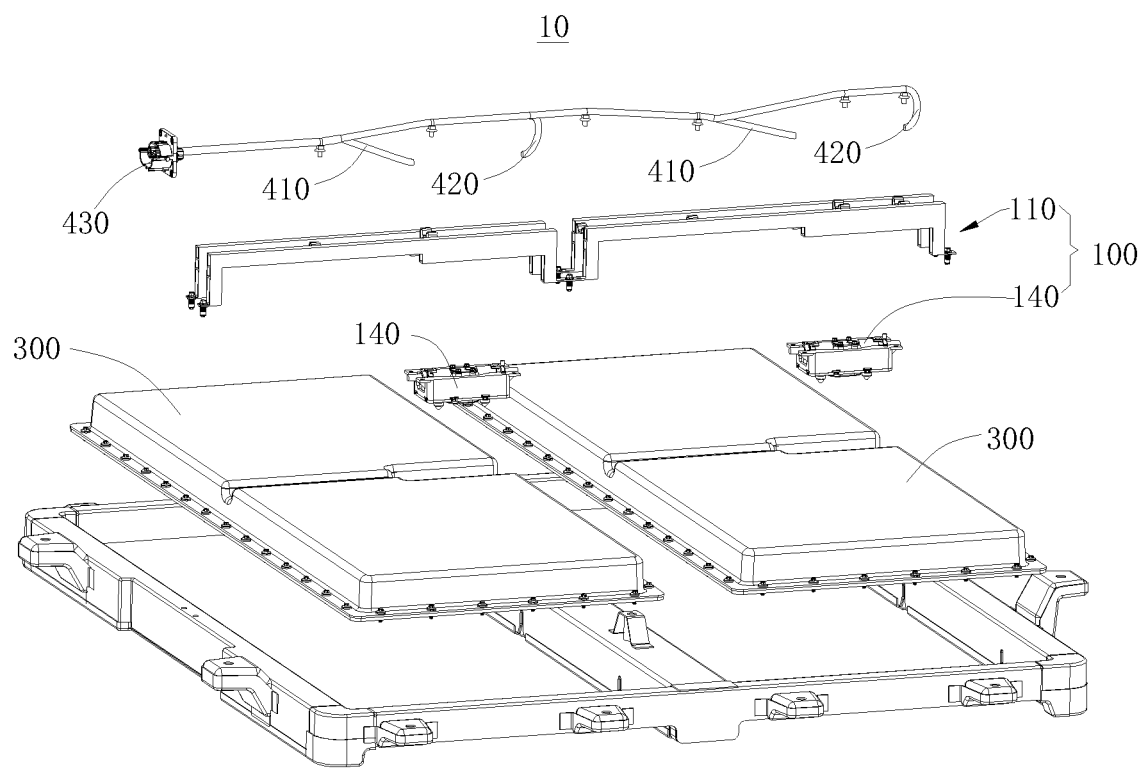
FIG. 3 is an exploded view of a battery assembly according to one embodiment of the present application.

As shown in FIG. 2 and FIG. 3, the bracket 100 includes a bracket body 110 and a second connector 140, the battery 300 includes a first connector 310, and the first connector 310 is configured to output electric energy of the battery 300. The second connector 140 is mounted on the bracket body 110. The second connector 140 is configured to be butted with the first connector 310 of the battery 300 so as to transmit the electric energy of the battery 300 to the electric apparatus body. The connecting end of the second connector 140 is arranged towards the battery 300 in the gravity direction, so that the first connector 310 of the battery 300 may be butted with the second connector 140 along the opposite direction of the gravity direction, and the first connector 310 is butted with the second connector 140. The connecting end of the second connector 140 is arranged towards the gravity direction, so that the first connector 310 of the battery 300 may be butted with the second connector 140 in the opposite direction of the gravity direction. In this way, after the first connector 310 is butted with the second connector 140, damage to the first connector 310 and/or the second connector 140 caused by the gravity of the battery 300 will be avoided, thereby preventing the influence on the use of the battery 300 or the electric apparatus 1. In the process of mounting the battery 300, the first connector 310 can be butted with the second connector 140 only by pushing the battery 300 to move along the opposite direction of the gravity, which is convenient and fast.

In some embodiments, the battery assembly 10 further includes a first conducting piece 410, a second conducting piece 420 and a butting terminal 430, where one end of the first conducting piece 410 and one end of the second conducting piece 420 are both connected to the second connector 140. The other end of the first conducting piece 410 and the other end of the second conducting piece 420 are both connected to the butting terminal 430, and the butting terminal 430 is directly or indirectly connected to the electric apparatus body.

Figure 4:
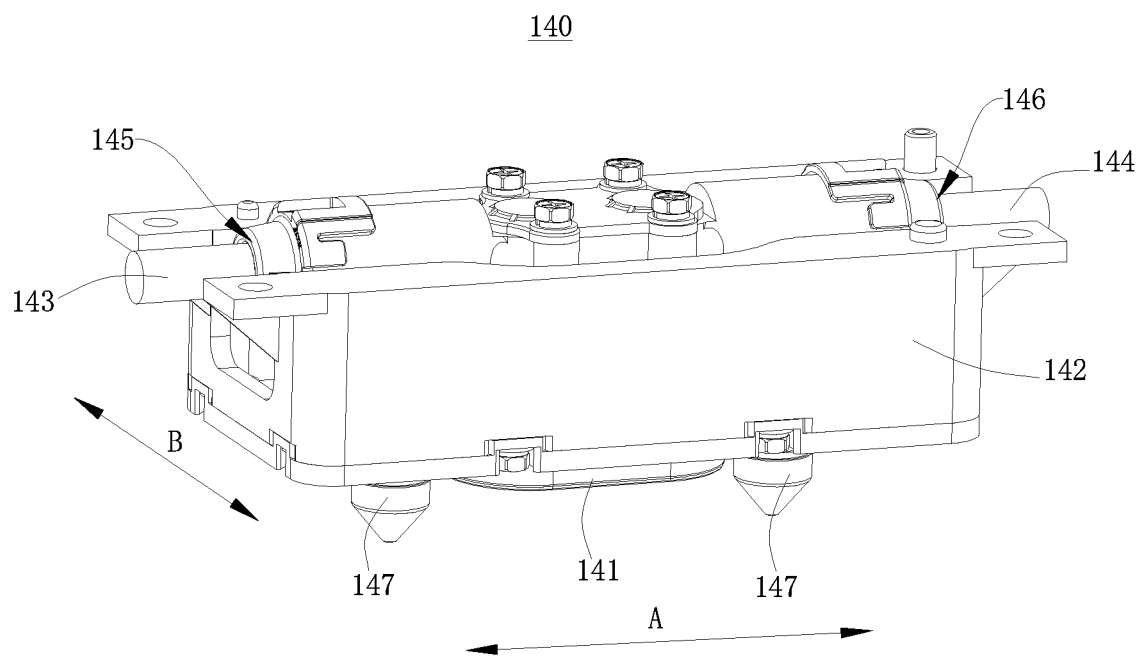
FIG. 4 is a schematic diagram of a second connector according to one embodiment of the present application.

As shown in FIG. 4, the connecting end of the second connector 140 includes a terminal 141; the terminal 141 is configured to be electrically connected to the battery 300; and when the second connector 140 is mounted on the fixing frame 114 of the bracket 100, the terminal 141 extends in the gravity direction. An extension direction of the terminal 141 is consistent with a butting direction of the first connector 310 and the second connector 140, so that bending, even breakage of the terminal 141 caused by that the extension direction of the terminal 141 is inconsistent with the butting direction in the butting process of the first connector 310 and the second connector 140 is avoided, thereby avoiding the influence on the conductivity between the first connector 310 and the second connector 140 and the electrical safety performance of the electric apparatus 1.

The second connector 140 further includes a base 142, a first lead 143 and a second lead 144, where the connecting end of the second connector 140 is fixed on the base 142; the terminal 141 of the connecting end of the second connector 140 includes a first terminal and a second terminal with opposite polarities; one end of the first lead 143 is connected to the first terminal; one end of the second lead 144 is connected to the second terminal; and the first lead 143 and the second lead 144 respectively stretch out of two opposite sides of the base 142 in a first direction A, the first direction A being perpendicular to the gravity direction. The first lead 143 and the second lead 144 respectively stretch out of two sides of the base 142 in the first direction A, so that the second connector 140 has a smaller size in a second direction B, and the occupied space of the second connector 140 in the second direction B can be reduced. It should be noted that the first direction A, the second direction B and the gravity direction are perpendicular to each other.

In addition, the first lead 143 and the second lead 144 stretch out of the base 142 towards opposite directions, so that the risk of shortcircuit between the first lead 143 and the second lead 144 is reduced, and the safety performance of the electric apparatus 1 is improved.

The first terminal and the second terminal are arranged at intervals in the first direction A, so that there is a certain distance between the two terminals with opposite polarities, the risk of shortcircuit between the first lead 143 and the second lead 144 is reduced, and the safety performance of the electric apparatus 1 is improved.

The first terminal and the second terminal may be arranged in other manners. For example, in some embodiments, the arrangement direction of the first terminal and the second terminal form an included angle with the first direction A.

In some embodiments, the first lead 143 and the second lead 144 are at least partially located in the base 142; a first wire outlet hole 145 and a second wire outlet hole 146 are formed on two opposite sides of the base 142 in the first direction A respectively; the first lead 143 stretches out of the first wire outlet hole 145; the second lead 144 stretches out of the second wire outlet hole 146; one end, stretching out of the first wire outlet hole 145, of the first lead 143 is configured to be electrically connected to the electric apparatus 1; and one end, stretching out of the second wire outlet hole 146, of the second lead 144 is configured to be electrically connected to the electric apparatus 1, so that the battery 300 can transmit electric energy to the electric apparatus 1 through the second connector 140.

Due to the arrangement of the first wire outlet hole 145 and the second wire outlet hole 146, the first lead 143 and the second lead 144 are separated and limited in respective spaces, so that the risk of shortcircuit between the first lead 143 and the second lead 144 is further reduced, and the safety performance of the electric apparatus 1 is improved. Furthermore, the first wire outlet hole 145 and the second wire outlet hole 146 can also play a role in extending the first lead 143 and the second lead 144 in a preset direction.

In some embodiments, a center line of the first wire outlet hole 145 coincides with a center line of the second outlet hole 146, so that the structure of the second connector 140 is symmetrical or tends to be symmetrical, and manufacturing is facilitated.

In some embodiments, the first wire outlet hole 145 and the second outlet hole 146 may also be arranged on the same side of the base 142 in the first direction A. After the second connector 140 is butted with the first connector 310, the first lead 143 and the second lead 144 stretch out of the base 142 from the same side of the base 142.

In some embodiments, a size of the base 142 in the first direction A is greater than a size of the base 142 in the second direction B, where the first direction A, the second direction B and the gravity direction are perpendicular to each other.

The first lead 143 and the second lead 144 are at least partially located in the base 142, which may be understood that the first lead 143 may be partially or all located in the base 142, and the second lead 144 may be partially or all located in the base 142. When both the first lead 143 and the second lead 144 are only partially located in the base 142, parts, extending out of the base 142, of the first lead 143 and the second lead 144 are electrically connected to the electric apparatus 1. When both the first lead 143 and the second lead 144 are all located in the base 142, a lead on the electric apparatus 1 needs to extend into the base 142 to be electrically connected to the first lead 143 and the second lead 144.

The first lead 143 and the second lead 144 are at least partially located in the base 142, which may further be understood that at least one of the first lead 143 and the second lead 144 is partially or all located in the base 142.

In some embodiments, one end, extending out of the base 142, of the first lead 143 is connected to the first conducting piece 410; and one end, extending out of the base 142, of the second lead 144 is connected to the second conducting piece 420.

In some other embodiments, the first conducting piece 410 and the first lead 143 may be of an integrated structure, and the second conducting piece 420 and the second lead 144 may be of an integrated structure.

The second connector 140 further includes a second guide portion 147, and the second guide portion 147 is connected to the base 142. There are two second guide portions 147. The two second guide portions 147 are arranged on two sides of the terminal 141 of the second connector 140 at intervals in the first direction A.

In some embodiments, a size of the base 142 in the first direction A is greater than a size of the base 142 in the second direction B, where the first direction A, the second direction B and the gravity direction are perpendicular to each other. The size of the base 142 in the first direction A is larger, which is beneficial for mounting of the first lead 143 and the second lead 144, the arrangement of the extension route and the arrangement of the first terminal, the second terminal and two second guide portions 147. Furthermore, the size in the first direction A is greater than the size in the second direction B, so that the size of the base 142 in the second direction is smaller, thereby reducing the occupied space of the bracket 100 and the weight of the bracket 100, and avoiding the burden of structural size and weight on the electric apparatus 1 by the arrangement of the bracket 100.

In some embodiments, the second connector 140 is arranged on the bracket body 110 in a floating manner, for example, the base 142 of the second connector 140 and the bracket body 110 are connected through an elastic piece, thereby realizing floating connection between the second connector 140 and the bracket body 110, and avoiding the situation that the first connector 310 cannot cooperate with the second connector accurately in place due to manufacturing or mounting errors in the butting process with the second connector 140.

Figure 5:
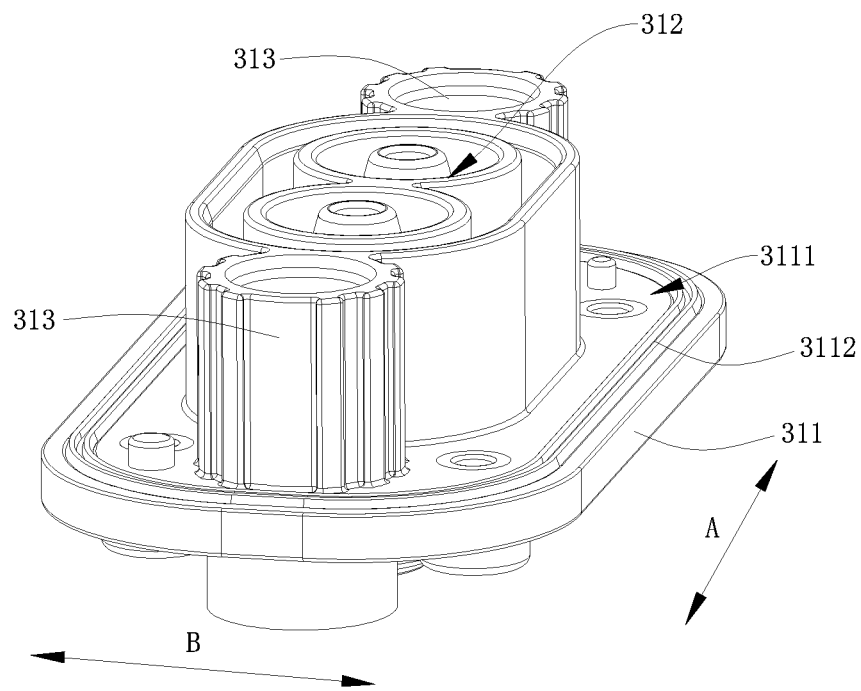
FIG. 5 is a schematic diagram of a first connector according to one embodiment of the present application.

As shown in FIG. 5, the first connector 310 includes a substrate 311 and a port 312, where the port 312 is arranged at the connecting end of the first connector 310; the substrate 311 is provided with a first surface 3111; one end of the connecting end of the first connector 310 is connected to the first surface 3111 of the substrate 311; and the first surface 3111 is provided with a sealing groove 3112. The contour of the sealing groove 3112 is matched with the contour of the substrate 311, and a sealing piece is arranged in the sealing groove 3112.

The connecting end of the first connector 310 includes the port 312, the port 312 is provided with a positive terminal and a negative terminal, and the port 312 penetrates through a first opening 3211, so that the positive terminal and the negative terminal of the first connector 310 can be butted with the terminal 141 of the second connector 140 respectively.

The first connector 310 is further provided with a first guide portion 313, the first guide portion 313 is connected to the substrate 311 of the first connector 310, and the first guide portion 313 is configured to guide the second connector 140 when the first connector 310 is butted, so that the second connector 140 is aligned with the position of the first connector 310. The arrangement of the first guide portion 313 can ensure that the first connector 310 is accurately butted with the second connector 140.

In order to further ensure the butting accuracy, the second connector 140 is provided with a second guide portion 147, the first guide portion 313 is configured to cooperate with the second guide portion 147 when the first connector 310 is butted with the second connector 140 to guide the second connector 140, so that the second connector 140 is aligned with the position of the first connector 310. The first guide portion 313 cooperates with the second guide portion 147 to guide the first connector 310 to be butted with the second connector 140, so that the butting accuracy of the first connector 310 and the second connector 140 can be improved.

In some embodiments, the first guide portion 313 is a guide sleeve, the second guide portion 147 is a guide column, and the guide sleeve cooperates with the guide column to guide the first connector 310 to be butted with the second connector 140, so that a simple implementation manner and high reliability are achieved. There are two first guide portions 313, and the two first guide portions 313 are respectively located on two sides of the port 312 of the first connector 310 in a first direction A. There are two second guide portions 147, and the second guide portions 147 are arranged in one-to-one correspondence with the first guide portions 313.

In some embodiments, the first guide portion 313 may be a guide column, and the second guide portion 147 may be a guide sleeve.

Figure 6:
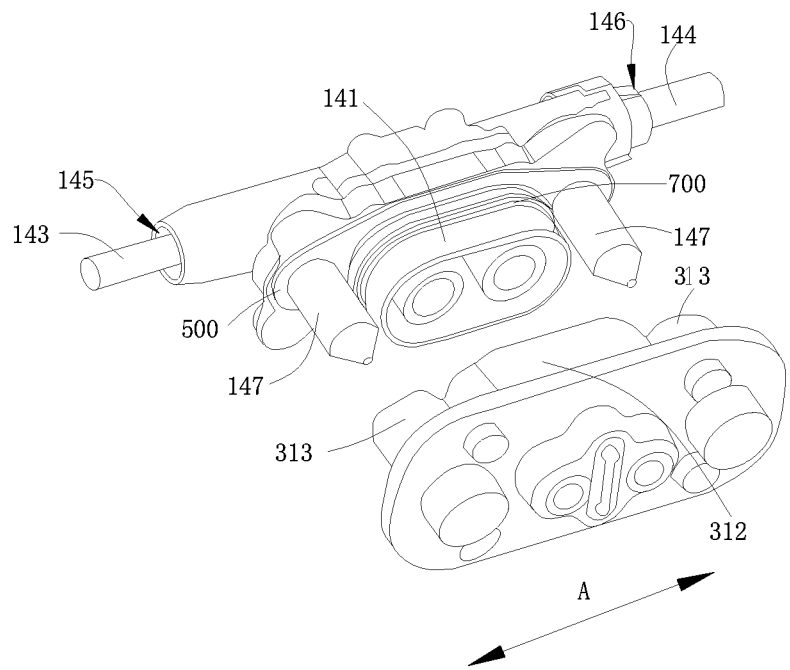
FIG. 6 is a schematic diagram of a first connector and a second connector according to one embodiment of the present application.
Figure 7:
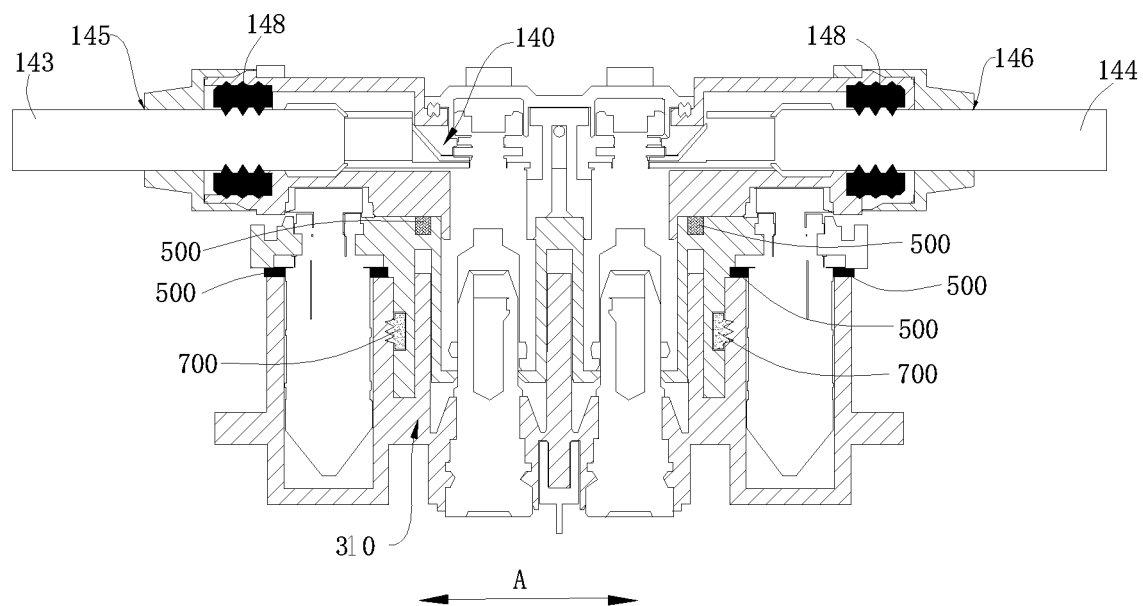
FIG. 7 is a section view after a first connector and a second connector provided by one embodiment of the present application is butted with each other.

As shown in FIG. 6 and FIG. 7, the battery assembly 10 further includes a first sealing piece 500. When the first guide portion 313 cooperates with the second guide portion 147 in place, the first guide portion 313 and the second guide portion 147 are hermetically connected through the first sealing piece 500. In some embodiments, the first sealing piece 500 is arranged on one side of the base 142 of the second connector 140 opposite to the first connector 310. The first sealing piece 500 is configured to seal an end face of the guide sleeve and the base 142 of the second connector 140 after the first connector 310 is butted with the second connector 140 so as to prevent dust, water and other impurities from entering the guide sleeve and the guide column, thereby avoiding damage to the guide sleeve and the guide column and the influence on the positioning and guide performance of the guide column and the guide sleeve. The first sealing piece 500 may be made of butadiene-acrylonitrile rubber, fluororubber, nylon and the like.

Cooperation in place refers to the cooperation state of the first guide portion 313 and the second guide portion 147 after the first connector 310 is butted with the second connector 140.

In some embodiments, the first sealing piece 500 may also be arranged on an end face of the guide sleeve of the first connector 310.

In some embodiments, the first guide portion 313 is a guide column and the second guide portion 147 is a guide sleeve, then the first sealing piece 500 is configured to seal an end face of the second guide portion 147 and the base 142 of the first connector 310. The first sealing piece 500 may be arranged on an end face of the guide sleeve of the second connector 140, or may also be arranged on one side of the substrate 311 of the first connector 310 opposite to the second connector 140.

When the guide sleeve cooperates with the guide column in place, the connecting end of the connector where the guide sleeve is located is sleeved on the connecting end of the connector where the guide column is located, and the end face of the connecting end of the connector where the guide sleeve is located and the connector where the guide column is located are sealed by the first sealing piece 500. In some embodiments, the connecting end of the first connector 310 is sleeved on the connecting end of the second connector 140, and the connecting end of the first connector 310 abuts against the first sealing piece 500, so that the connecting end of the first connector 310 is sleeved on the connecting end of the second connector 140 for sealing.

The connecting end of the first connector 310 and the connecting end of the second connector 140 are hermetically connected, thereby preventing fluid or solid particles from entering between the first connector 310 and the second connector 140 from a butting gap of the first connector 310 and the second connector 140, and preventing external impurities such as dust and water from entering between the first connector 310 and the second connector 140 so as to avoid the influence on the electric connection performance and the safety performance of the first connector and the second connector. The first guide portion 313 and the second guide portion 147 are hermetically connected, and the connecting end of the first connector 310 and the connecting end of the second connector 140 share a sealing structure, so that the number of the sealing structure of the battery assembly 10 can be reduced, and the sealing connection of the battery assembly 10 has continuity, thereby further ensuring the sealing effect.

In some embodiments, the first guide portion 313 and the second guide portion 147 may adopt other guide cooperation manners. For example, the first guide portion 313 is a guide column and the second guide portion 147 is a sliding groove cooperating with the guide column; or the first guide portion 313 is a sliding groove and the second guide portion 147 is a guide column cooperating with the sliding groove.

In order to improve the sealing property of the first connector 310 on the first opening 3211, the battery 300 further includes a sealing piece (not shown in the figure), where the sealing piece is arranged between the first surface 3111 and an inner surface of a box body 320 and around the first opening 3211, and is configured to realize sealing connection between the first connector 310 and the box body 320.

The use environment of the battery 300 is not a dust-free environment. On the contrary, the environment is often accompanied with a large amount of dust, rain water and other impurities.

In some embodiments, the battery assembly 10 further includes a second sealing piece 700. When the first connector 310 cooperates with the second connector 140 in place, the connecting end of the first connector 310 and the connecting end of the second connector 140 are sealed through the second sealing piece 700. After the first connector 310 is butted with the second connector 140, the connecting end of the first connector 310 is sleeved on the connecting end of the second connector 140. The second sealing piece 700 is arranged between an internal peripheral surface of the connecting end of the first connector 310 and an external peripheral surface of the connecting end of the second connector 140. The second sealing piece 700 may be arranged on the internal peripheral surface of the connecting end of the first connector 310, or may also be arranged on the external peripheral surface of the connecting end of the second connector 140.

The second sealing piece 700 may be made of butadiene-acrylonitrile rubber, fluororubber, nylon and the like. The arrangement of the second sealing piece 700 can prevent fluid or solid particles from entering between the first connector 310 and the second connector 140 from a butting gap of the first connector 310 and the second connector 140, and prevent external impurities such as dust and water from entering between the first connector 310 and the second connector 140 so as to avoid the influence on the electric connection performance and the safety performance of the first connector and the second connector. In addition, the arrangement of the second sealing piece 700 can play a buffer role in the butting position of the first connector 310 and the second connector 140 and prevent the first connector 310 and the second connector 140 from bearing large impact at the butting position due to vibration and impact of the electric apparatus 1, thereby avoiding the influence on the service life of the first connector 310 and the second connector 140.

In some embodiments, after the first connector 310 is butted with the second connector 140, the connecting end of the second connector 140 is sleeved on the connecting end of the first connector 310, and the second sealing piece 700 is arranged between the internal peripheral surface of the connecting end of the second connector 140 and the external peripheral surface of the first connector 310. The second sealing piece 700 may be arranged on the internal peripheral surface of the connecting end of the second connector 140, or may also be arranged on the external peripheral surface of the connecting end of the first connector 310.

The second sealing piece 700 is arranged between the internal peripheral surface of the connecting end of the first connector 310 and the external peripheral surface of the connecting end of the second connector 140, or the second sealing piece 700 is arranged between the internal peripheral surface of the connecting end of the second connector 140 and the external peripheral surface of the connecting end of the first connector 310, so the second sealing piece 700 can provide a radial abutting force for the internal peripheral surface and the external peripheral surface which are in contact with the second sealing piece 700, thereby enabling the first connector 310 to be butted with the second connector 140 more firmly and reliably while ensuring the sealing property.

The dust, water and other impurities in the environment have great influence on the conductivity and the safety performance of the first lead 143 and the second lead 144. In some embodiments, the second connector 140 further includes a sealing ring 148; the sealing piece is arranged in the base 142; and the sealing ring 148 is configured to realize sealing between the first lead 143 and the base 142 and sealing between the second lead 144 and the base 142. The arrangement of the sealing ring 148 can prevent the dust, water and other impurities from entering between the first lead 143 and the base 142 and between the second lead 144 and the base 142, thereby ensuring the conductivity of the first lead 143 and the second lead 144, and improving the electric safety performance.

Figure 8:
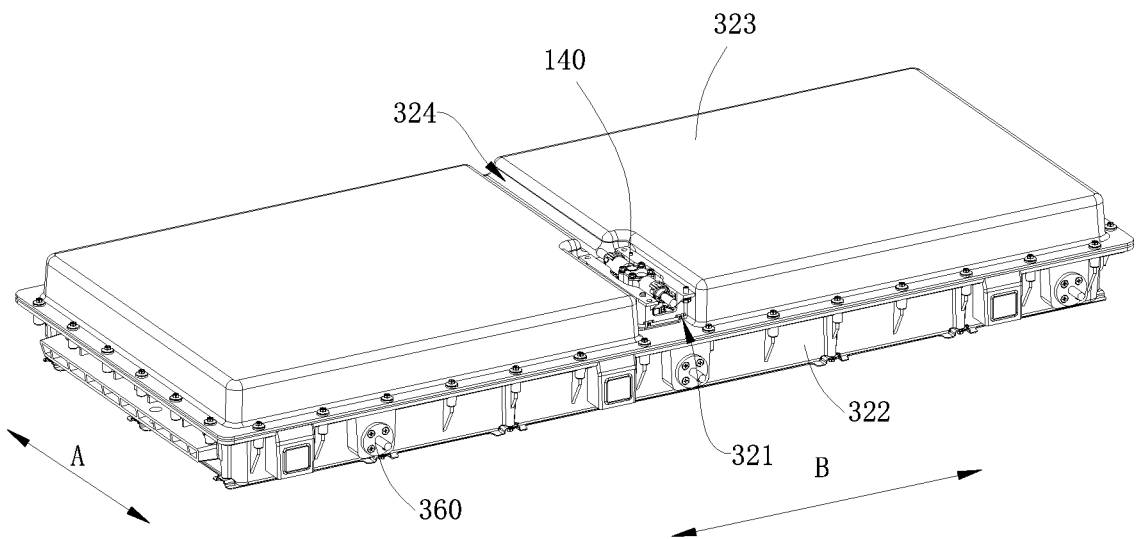
FIG. 8 is a section view after a second connector and a first connector provided by one embodiment of the present application is butted with each other.
Figure 9:
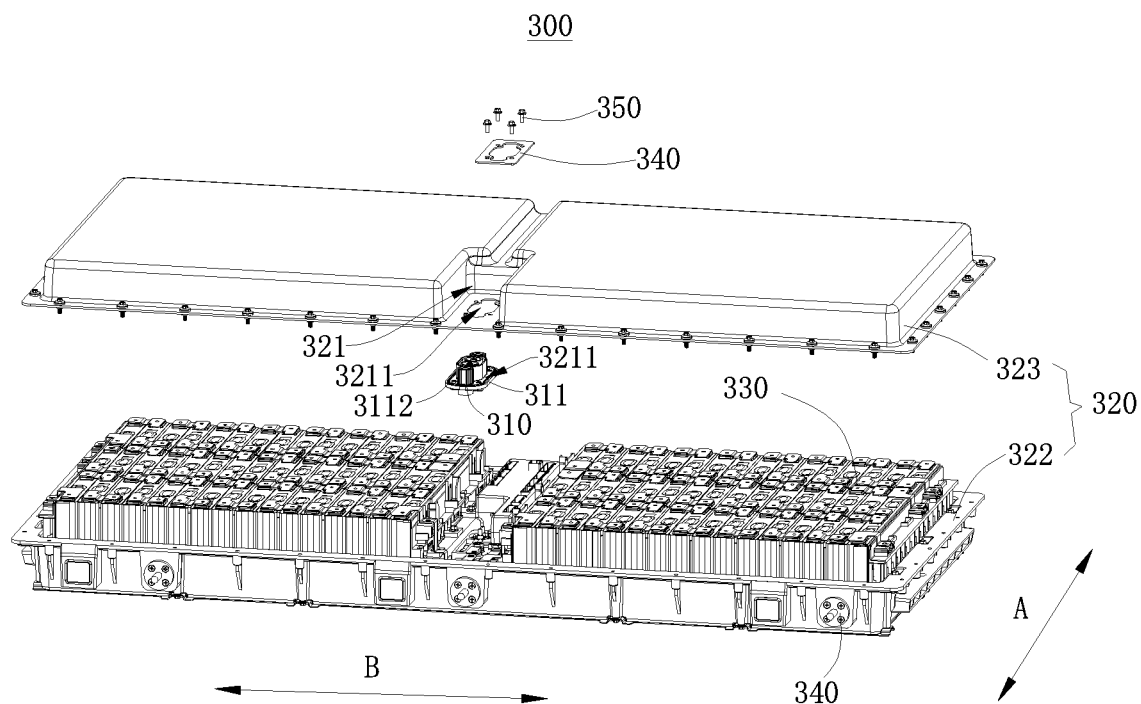
FIG. 9 is an exploded view of a battery according to one embodiment of the present application.

As shown in FIG. 8 and FIG. 9, in some embodiments, the battery 300 further includes a box body 320 and a battery cell 330, where the battery cell 330 is arranged in the box body 320; and the first connector 310 is electrically connected to the battery cell 330 to output electric energy of the battery 300. The first connector 310 is configured to be butted with the second connector 140 to transmit the electric energy of the battery 300 to the electric apparatus 1.

Figure 10:
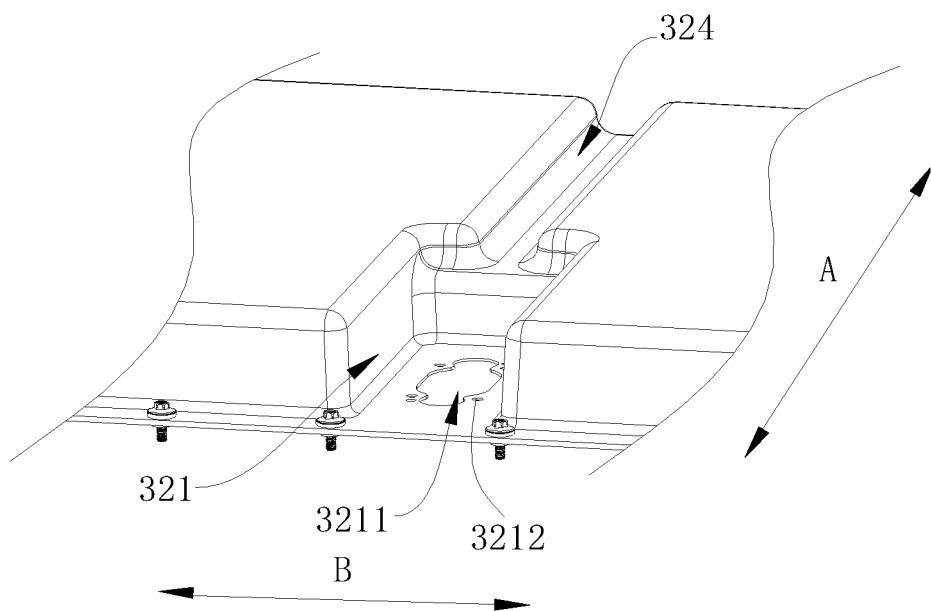
FIG. 10 is a schematic diagram of an upper cover body according to one embodiment of the present application.

As shown in FIG. 9 and FIG. 10, in some embodiments, a groove 321 which is recessed towards the inside of the box body 320 is formed in an outer surface of the box body 320, the first connector 310 is arranged in the groove 321, and it is only necessary to align a top opening of the groove 321 with the terminal 141 of the second connector 140 in the gravity direction ad move the battery 300 in the opposite direction of the gravity direction to realize rapid butting between the battery 300 and the second connector 140. After the second connector 140 is butted with the first connector 310, the second connector 140 is at least partially located in the groove 321.

The groove 321 is configured to set the first connector 310, thereby preventing the first connector 310 from excessively occupying the internal space of the box body 320. Furthermore, the groove 321 can make a butting space for butting of the first connector 310 and the second connector 140. When it is necessary to output the electric energy of the battery cell 330, the second connector 140 on the electric apparatus 1 is connected to the first connector 310 at the position of the groove 321, and the second connector 140 is partially or all located in the groove 321, so that a distance between the battery 300 and the electric apparatus 1 can be reduced, the distance between the battery 300 and the electric apparatus 1 is closer, the mounting space required by mounting the battery 300 on the electric apparatus 1 can be reduced, and the structure of the electric apparatus 1 on which the battery 300 is mounted is more compact.

In some embodiments, the terminal 141 of the second connector 140 is arranged towards the battery 300 in the gravity direction, so that the first connector 310 may be butted with the second connector 140 in the opposite direction of the gravity direction. After the second connector 140 is butted with the first connector 310, the second connector 140 is partially or all located in the groove 321, so that the size of the electric apparatus 1 for mounting the battery 300 in the gravity direction can be reduced; and the first connector 310 is butted with the second connector 140 in the opposite direction of the gravity, so that the space of the electric apparatus 1 in the gravity direction can be completely utilized, and the transverse size of the electric apparatus 1 can be reduced.

Continuously referring to FIG. 9 and FIG. 10, in some embodiments, the box body 320 includes a lower shell 322 and an upper cover body 323; the battery cell 330 is arranged in the lower shell 322; the upper cover body 323 covers the lower shell 322; the groove 321 is formed on an outer surface of the upper cover body 323, and the upper surface of the upper cover body 323 is recessed downwards; and the groove 321 penetrates through one side of the cover body 323 in a width direction. The box body 320 adopts a split type structure, thereby facilitating mounting of other parts in the battery cell 330 and the box body 320, and facilitating manufacturing and forming of the box body 320.

In some embodiments, the first connector 310 is arranged on a bottom wall of the groove 321, so that the first connector 310 is located at the deepest position of the groove 321. When the second connector 140 is butted with the first connector 310, the first connector can at most be located in the groove 321, so that the distance between the battery 300 and the electric apparatus 1 is further reduced, and the structure of the mounted battery 300 and the electric apparatus 1 is more compact.

In other embodiments, the first connector 310 may also be arranged on a side wall of the groove 321.

Since a size of the base 142 of the second connector 140 in the first direction A is greater than a size in the second direction B, correspondingly, a size of the groove 321 in the first direction A is greater than a size in the second direction B, so that the space in the box body 320 occupied by the groove 321 in the second direction B can be reduced, and the influence on the placement of the battery cell 330 is not affected.

A first opening 3211 is formed in a bottom wall of the groove 321, and the first connector 310 penetrates through the first opening 3211 to output electric energy of the battery cell 330 to the outside of the box body 320 through the first connector 310. The first connector 310 penetrates through the first opening 3211 to facilitate connection with the second connector 140 and the battery cell 330 in the box body 320 at the same time; moreover, the first connector 310, through the first opening 3211, is provided with two parts which are located in the groove 321 and accommodated in the box body 320, so that the space of the groove 321 occupied by the first connector 310 is reduced, more space is provided for the butting of the second connector 140 and the first connector 310, and the second connector 140 can be located in the groove 321 as much as possible, thereby further making the structure of the mounted battery 300 and the electric apparatus 1 more compact.

The first connector 310 penetrates through the first opening 3211 from the box body 320, and the first connector 310 covers the first opening 3211 and is hermetically connected to the box body 320, so that the first opening 3211 is closed. The first connector 310 covers and seals the first opening 3211, thereby preventing dust in rain water and air from entering the box body 320 from the first opening 3211 and avoiding damage to parts in the box body 320.

The substrate 311 of the first connector 310 covers the first opening 3211 from the inside of the box body 320, the first surface 3111 of the substrate 311 faces towards the first opening 3211, and the port 312 penetrates from the first opening 3211. The substrate 311 covers the first opening 3211 from the inside of the box body 320 to seal the first opening 3211. After the second connector 140 is butted with the first connector 310, the substrate 311 can prevent the first connector 310 from moving in a direction close to the second connector 140 and prevent the second connector 140 from pulling the first connector 310 and breaking electric connection between the first connector 310 and the battery cell 330.

In some embodiments, in the substrate 311 of the first connector 310, a sealing groove 3112 is formed around the first opening 3211. When the first connector 310 penetrates through the first opening 3211, the sealing piece abuts against a lower surface of the upper cover body 323 from bottom to top, thereby realizing sealing between the first connector 310 and the box body 320. The sealing piece is arranged in the box body 320, thereby avoiding sealing ineffectiveness caused by external abrasion and corrosion. In addition, the sealing piece is arranged in the box body 320, so that the space of the groove 321 is prevented from being occupied by the sealing piece, and the groove 321 can make more space for the butting of the second connector 140 and the first connector 310. The sealing piece is arranged around the first opening 3211, thereby having higher sealing property.

In some embodiments, the sealing groove 3112 may also be formed in an internal surface of the upper cover body 323, and the sealing piece is arranged in the sealing groove 3112 of the upper cover body 323. When the first connector 310 penetrates through the first opening 3211, the first connector 310 abuts against the sealing piece from bottom to top, thereby realizing sealing between the first connector 310 and the box body 320. A material of the sealing piece may be butadiene-acrylonitrile rubber, fluororubber, nylon and the like.

In some embodiments, the first connector 310 and the box body 320 may also be hermetically sealed through other manners.

A guide groove 324 which is recessed towards the inside of the box body 320 is formed in an outer surface of the upper cover body 323 of the box body 320; the guide groove 324 communicates with the groove 321; and the guide groove 324 extends in a width direction of the upper cover body 323 and penetrates through one side of the upper cover body 323 away from the groove 321 in the width direction. A height position of a bottom wall of the groove 321 is lower than a height position of a bottom wall of the guide groove 324, thereby facilitating placement of a conductive wire between the second connector 140 and the electric apparatus 1. The fixing frame 114 of the bracket body 110 may also be partially accommodated in the guide groove 324, so that a size of the battery assembly 10 in the gravity direction is reduced, and the fixing frame 114 limits the lead mounted in the guide groove 324.

It should be noted that the first direction A, the extension direction of the groove 321 and the extension direction of the guide groove 324 are consistent.

In order to ensure a stable and reliable connection relationship between the first connector 310 and the box body 320, in some embodiments, the battery 300 further includes a fixing piece 350, where the fixing piece 350 is configured to penetrates through a first through hole 3212 in the bottom wall of the groove 321 to be connected to the first connector 310. A threaded connection piece may be a bolt, a screw and the like. The first connector 310 is fixed on the box body 320 through the fixing piece 350, so that the first connector 310 does not move relative to the box body 320, and a stable connection relationship can be maintained between the first connector 310 and the battery cell 330, and between the first connector 310 and the second connector 140.

Figure 11:
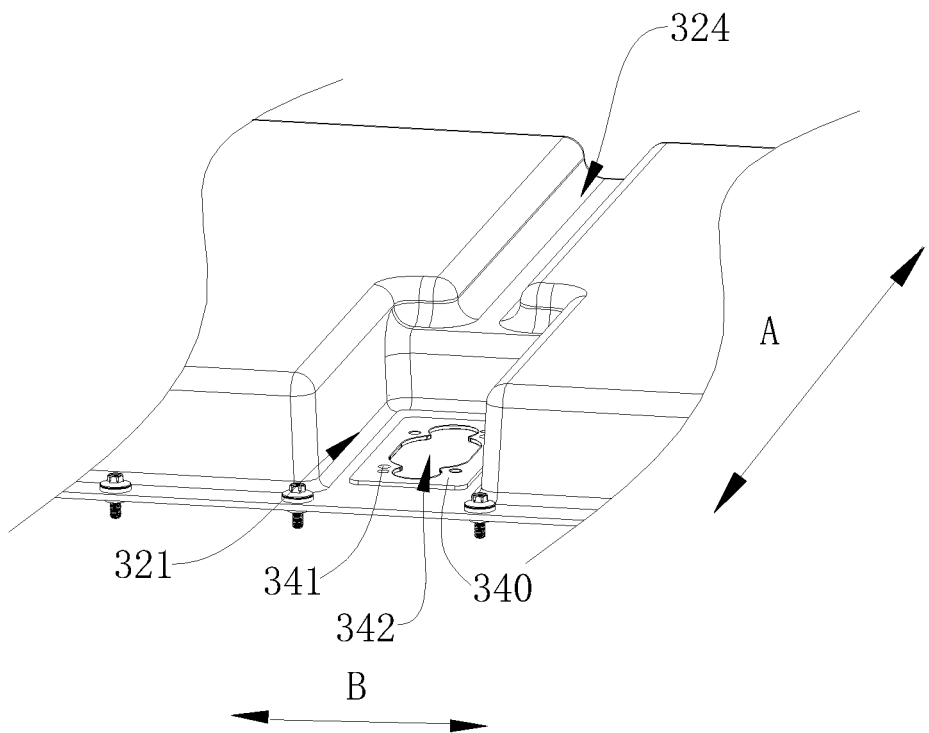
FIG. 11 is a schematic diagram that a reinforcing plate is arranged in a groove according to one embodiment of the present application.

In some embodiments, as shown in FIG. 11, the battery 300 further includes a reinforcing plate 340, where the reinforcing plate 340 is arranged on the bottom wall of the groove 321; the reinforcing plate 340 is provided with a second through hole 341 and a second opening 342 for the first connector 310 to penetrate through; the first opening 3211 aligns with the second opening 342; and the port 312 of the first connector 310 and the first guide portion 313 sequentially penetrates through the first opening 3211 and the second opening 342. The second through hole 341 is aligned with the first through hole 3212, and the fixing piece 350 sequentially penetrates through the second through hole 341 and the first through hole 3212 to be connected to the first connector 310 so as to fix the reinforcing plate 340 and the first connector 310 on the box body 320. The reinforcing plate 340 can increase the stressed area and ensure that the whole surface is sealed.

The arrangement of the reinforcing plate 340 can further improve the connection stability between the first connector 310 and the box body 320. When the second connector 140 on the electric apparatus 1 is butted with the first connector 310, the reinforcing plate 340 can bear impact. Furthermore, the first opening 3211 is formed in a bottom wall of the groove 321, so that the strength of the bottom wall of the groove 321 is reduced, and the bearing capacity of the bottom wall of the groove 321 is reduced. The arrangement of the reinforcing plate 340 can remedy the defect of reduced bearing capacity caused by that the first opening 3211 is formed in the bottom wall of the groove 321.

In some embodiments, there are a plurality of first through holes 3212; the first through holes 3212 are formed on the edge of the first opening 3211 at intervals; a plurality of through holes 341 are formed in the reinforcing plate 340; the second through hole 341 are formed in one-to-one correspondence with the first through holes 3212; the first through holes 3212 are formed in one-to-one correspondence with mounting holes in the first connector 310; and one fixing piece 350 penetrates through each of each second through hole 341, the corresponding first through hole 3212 and the mounting hole in the first connector 310, so that the first connector 310, the box body 320 and the reinforcing plate 340 are connected at many places, uniform and stable connection is ensured, and seismic and impact resistance is improved. In addition, the fixing piece 350 fixes the reinforcing plate 340 and the first connector 310 on the box body 320 at the same time, so that the number of the fixing piece 350 the weight of the battery 300 and the assembling difficulty of the battery 300 can be reduced, and the cost can be saved.

The battery 300 further includes a locking portion 360 (referring to FIG. 7 and FIG. 8); and the locking portion 360 is mounted on an outer side of the box body 320.

Figure 12:
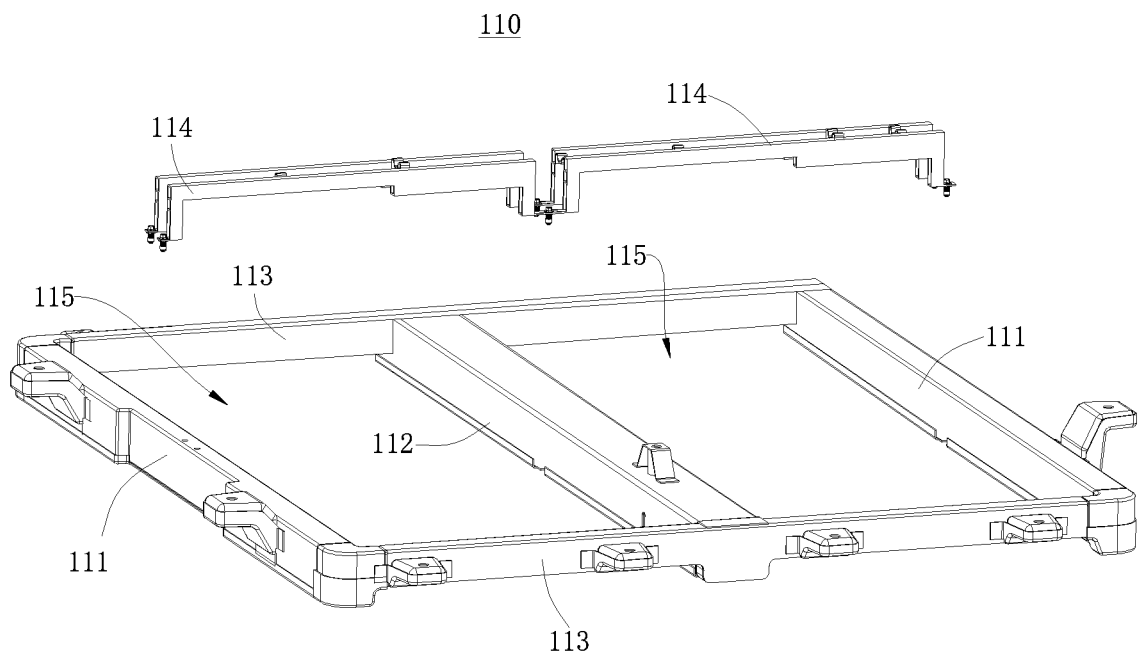
FIG. 12 is a schematic diagram of a bracket body according to one embodiment of the present application.

As shown in FIG. 12, the bracket body 110 includes a first beam 111, a second beam 112 and a fixing frame 114, where the first beam 111 and the second beam 112 are arranged oppositely; and an accommodating space 115 for accommodating the battery 300 is formed between the first beam 111 and the second beam 112.

The bracket 100 further includes a third beam 113, and the third beam 113 is connected to the first beam 111 and the second beam 112. There may be one, two or more third beams 113. In some embodiments, there are two third beams 113. The two third beams 113 are arranged oppositely. The arrangement of the third beam 113 makes the structural stability of the bracket body 110 higher, thereby facilitating stable mounting of the battery 300.

In some embodiments, there are two first beams 111, and there is one second beam 112. The two first beams 111 are arranged oppositely, the two first beams 111 are connected to one third beam 113, the second beam 112 is located between the two first beams 111 to form two accommodating spaces 115, and each accommodating space 115 is correspondingly provided with one second connector 140. Two ends of the second beam 112 are connected to two third beams 113 respectively. The second beam 112, the two first beams 111 and the two third beams 113 jointly form two square accommodating spaces 115. The two accommodating spaces 115 share one second beam 112.

The bracket body 110 forms two accommodating spaces 115 through the second beam 112, which can accommodate two batteries 300. The two batteries 300 may provide a large amount of electric energy for the electric apparatus 1 so as to ensure the normal work of the electric apparatus 1; or one battery 300 of the two batteries 300 serves as a standby power supply, so that the electric apparatus 1 can work continuously and stably for a long time.

In some embodiments, each accommodating space 115 is correspondingly provided with a fixing frame 114, the second connector 140 is mounted on the fixing frame 114, and the connecting end of the second connector 140 is arranged towards the battery 300 in the gravity direction, so that the battery 300 may be butted with the second connector 140 in the opposite direction of the gravity direction, thereby realizing electric connection between the battery 300 and the second connector 140. Each fixing frame 114 is correspondingly provided with one second connector 140, so that the battery 300 of each accommodating space 115 is provided with a second connector 140 butted with the battery 300.

In some embodiments, the accommodating space 115 may be divided into a plurality of sub-spaces, and each sub-space may accommodate one battery 300. Correspondingly, the fixing frame 114 corresponding to the accommodating space 115 may be provided with second connectors 140 of which the number corresponds to the number of the sub-spaces.

The fixing frame 114 is U-shaped, and the fixing frame 114 is arranged across and above the corresponding accommodating space 115, so that an inlet for the battery 300 to enter is formed below the accommodating space 115, thereby facilitating the butting between the first connector 310 and the second connector 140 in the opposite direction of the gravity. One end of each fixing frame 114 is connected to the first beam 111, and the other end of each fixing frame 114 is connected mutually.

The U-shaped fixing frame 114 can ensure that a space defined by the fixing frame 114, the first beam 111 and the second beam 112 has a sufficient space in the gravity direction to match the thickness of the battery 300, so that the battery 300 can be completely accommodated in the space defined by the fixing frame 114, the first beam 111 and the second beam 112 after being mounted on the bracket body 110, and the battery 300 is stably mounted on the bracket body 110.

In order to ensure the structural stability of the bracket body 110 and the bearing capacity of the bracket body 110, one end, away from the first beam 111, of each fixing frame 114 may also be connected to the second beam 112.

Figure 13:
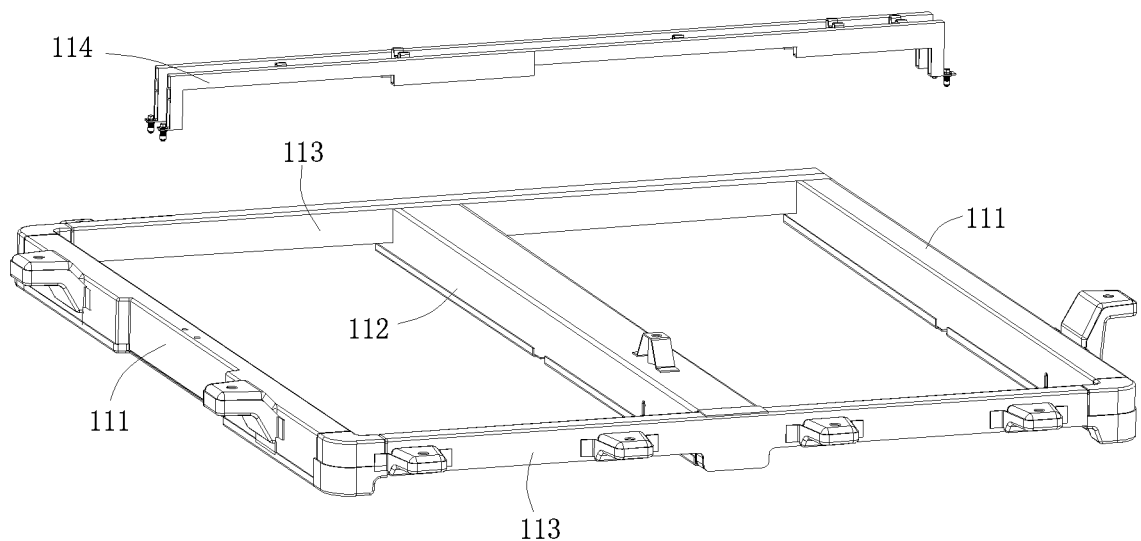
FIG. 13 is a schematic diagram of a bracket according to another embodiment of the present application.

As shown in FIG. 13, in some embodiments, two accommodating spaces 115 share one fixing frame 114, the fixing frame 114 is U-shaped, and two ends of the fixing frame 114 are connected to two first beams 111 respectively.

Figure 14:
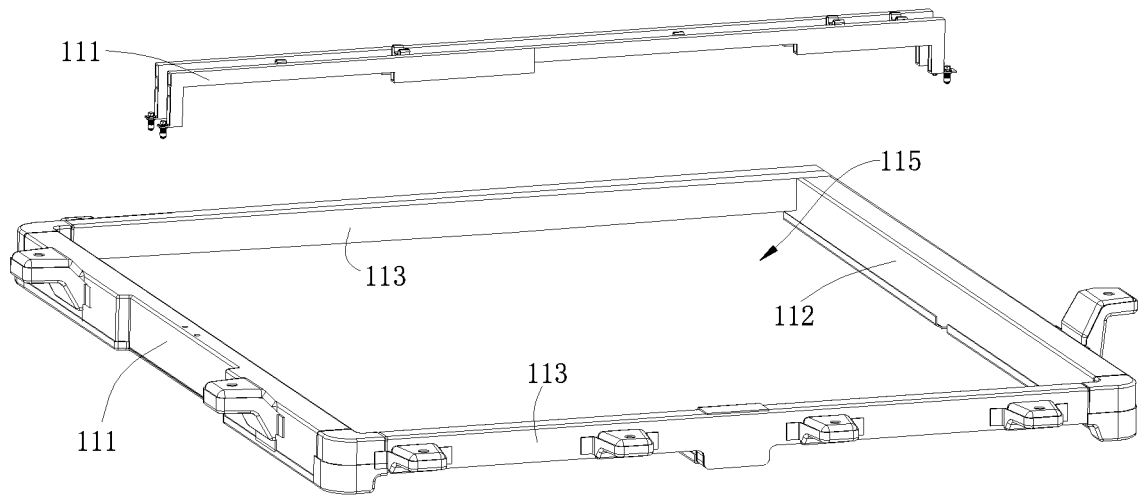
FIG. 14 is a schematic diagram of a bracket according to yet another embodiment of the present application.

As shown in FIG. 14, in some embodiments, there is one accommodating space 115, that is, one first beam 111, one second beam 112 and two third beams 113 jointly define a square accommodating space 115, and two ends of the U-shaped fixing frame 114 are connected to the first beam 111 and the second beam 112 respectively. In some embodiments, the bracket body 110 may only include a first beam 111, a second beam 112 and a fixing frame 114, and the accommodating space 115 is defined by the first beam 111 and the second beam 112.

In some embodiments, the bracket body 110 may also form three or more accommodating spaces 115.

The bracket 100 further includes a locking mechanism 130. The locking mechanism 130 is mounted on the bracket body 110 and is configured to lock the battery 300 on the bracket body 110. The electric apparatus 1 may vibrate or suffer from impact in the working process; and due to the arrangement of the locking mechanism 130, the battery 300 can be stably mounted on the bracket body 110, and power can be stably supplied for the electric apparatus 1 in a case that the electric apparatus 1 vibrates and suffers from impact.

The bracket body 110 is provided with a channel 116 extending in the gravity direction, and the channel 116 extends to a lower surface of the bracket body 110, so that the locking portion 360 can enter and exit the channel 116; the locking mechanism 130 is configured to lock the locking portion 360 when the locking portion 360 moves upwards to the channel 116; and the locking mechanism 130 is configured to unlock the locking portion 360, so that the locking portion 360 moves downwards under the gravity action of the battery 300 to be separated from the channel 116.

One objective of the present application can realize rapid change of the battery 300 and the bracket 100. According to the present application, the connecting end of the second connector 140 on the bracket 100 is arranged towards the battery 300 in the gravity direction, so that the first connector 310 of the battery 300 can be rapidly butted with the second connector 140 of the bracket 100 in the opposite direction of the gravity direction. In order to maintain the stable butting of the battery 300 and the bracket 100, the locking mechanism may be provided to lock the battery 300 on the bracket 100. However, the locking mechanism 130 of the bracket 100 in related art has a complex structure, and the locking and unlocking processes of the battery 300 are complex, thereby not facilitating rapid change of the battery 300.

Figure 15:
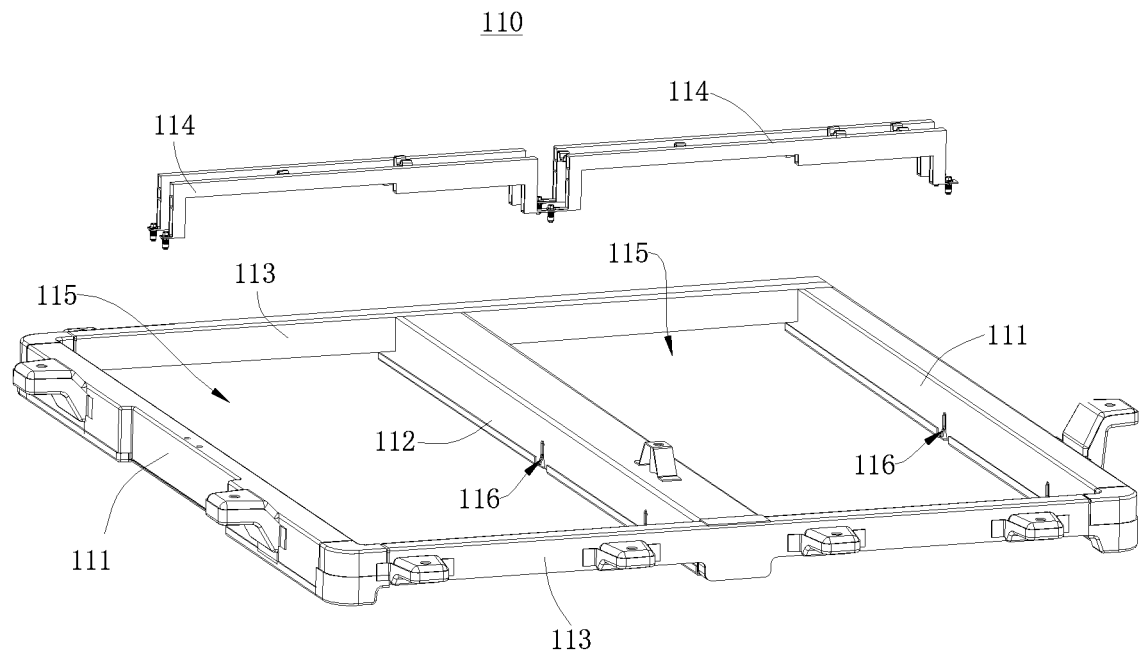
FIG. 15 is a schematic diagram of a bracket body with a channel according to one embodiment of the present application.

In view of this, as shown in FIG. 15, the bracket body 110 is provided with the channel 116 extending in the gravity direction, and the channel 116 extends to the lower surface of the bracket body 110, so that the locking portion 360 can enter and exit the channel 116. The locking mechanism 130 is configured to lock the locking portion 360 when the locking portion 360 moves upwards to a predetermined position of the channel 116; and the locking mechanism 130 is configured to unlock the locking portion 360, so that the locking portion 360 moves downwards under the gravity action of the battery 300 to be separated from the channel 116.

The first beam 111 and the second beam 112 are both provided with channels 116, the channel 116 on the first beam 111 extends to the lower surface of the first beam 111, and the channel on the second beam 112 extends below the second beam 112.

Based on the above solution, in the process of locking or unlocking the battery 300, the battery 300 only needs to move upwards or downwards in the channel 116, and it is unnecessary to adjust the battery 300 in other directions (such as the front and back directions of the vehicle). In particular, when the battery 300 is unlocked and after the locking mechanism 130 unlocks the locking portion 360, the locking portion 360 of the battery 300 can be separated from the channel 116 under the gravity action of the battery 300, so that the battery 300 is locked and unlocked conveniently and rapidly, the mounting and dismounting efficiency of the battery 300 is improved, and rapid change of the battery 300 is realized. In addition, for the bracket body 110, it is only necessary to provide the channel 116 to cooperate with the locking portion 360 without excessive design; therefore, it is beneficial to simplify the structure of the bracket body 110.

The "predetermined position" of the channel 116 may be any appropriate position in the channel 116. For example, in the embodiment shown in FIG. 3, an upper end of the channel 116 is closed, and the "predetermined position" may be the upper end of the channel 116. In other embodiments where the channel 116 is closed or open (not shown), a limiting protrusion may be arranged on a side wall of the channel 116, and the "predetermined position" may be a position limited by a bottom surface of the limiting protrusion.

Figure 16:
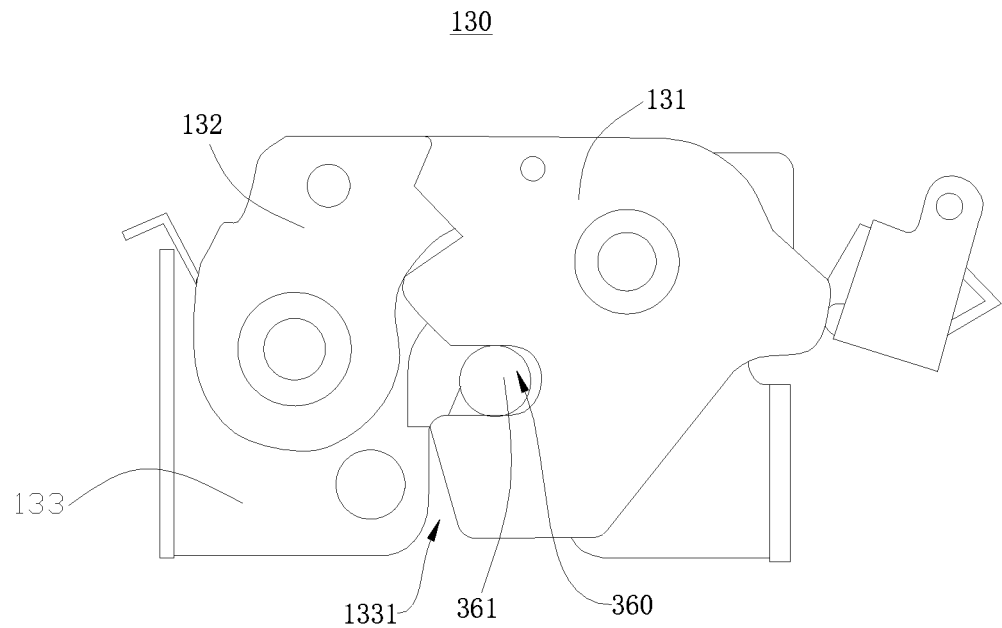
FIG. 16 is a schematic diagram of a first angle of view of a locking mechanism according to one embodiment of the present application.
Figure 17:
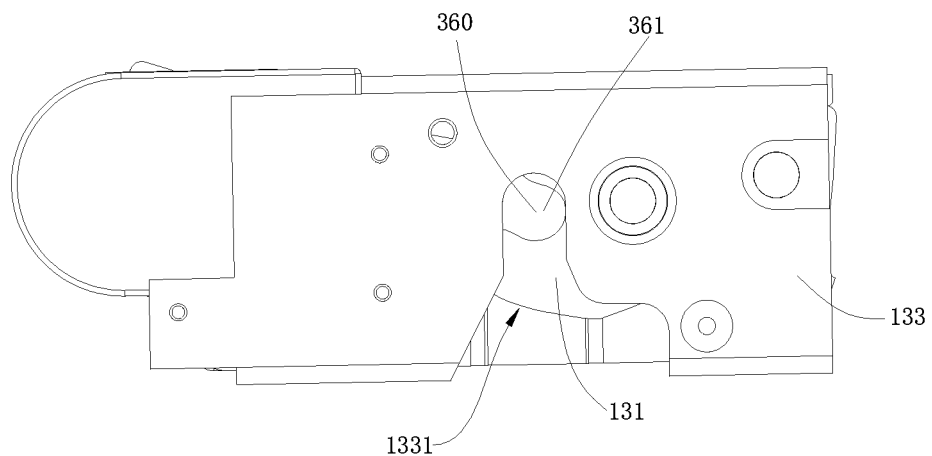
FIG. 17 is a schematic diagram of a second angle of view of a locking mechanism according to one embodiment of the present application.

The locking mechanism 130 may be of any appropriate structure. As shown in FIG. 16 and FIG. 17, in one embodiment of the present application, the locking mechanism 130 may include a first locking piece 131, a second locking piece 132 and a mounting base 133, where the first locking piece 131 is rotatably mounted on the mounting base 133; the mounting base 133 is connected to the bracket body 110; and the mounting base 133 is provided with a gap 1331 corresponding to a sliding channel. The second locking piece 132 is configured to prevent the first locking piece 131 from rotating so as to maintain the first locking piece 131 at a locked position when the first locking piece 131 rotates to the locked position. The first locking piece 131 is configured to prevent the locking portion 360 located at the predetermined position of the channel 116 from moving downwards when being located at the locked position.

Figure 18:
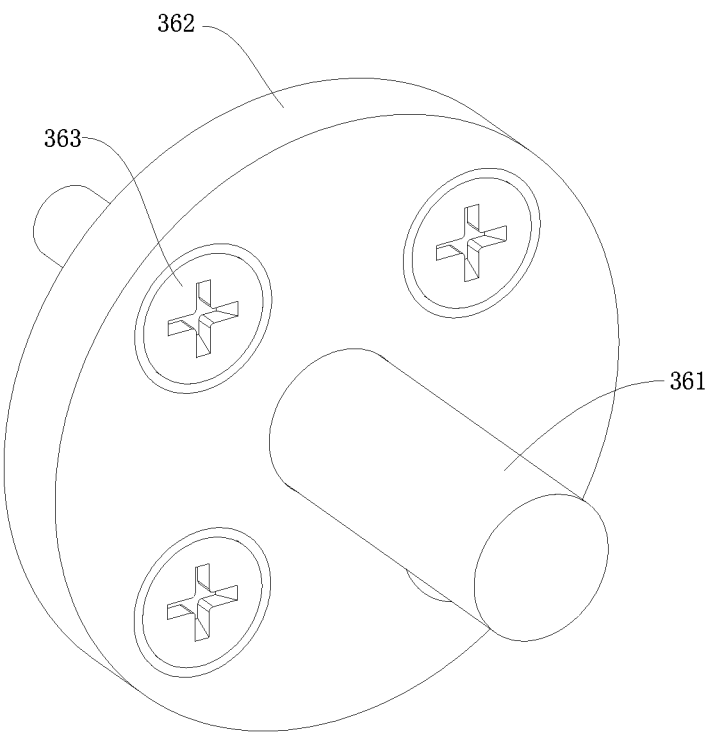
FIG. 18 is a schematic diagram of a first angle of view of a locking portion according to one embodiment of the present application.

As shown in FIG. 18, the locking portion 360 of the battery 300 may include a locking pin 361, where one end of the locking pin 361 is connected to the box body 320 and the other end of the locking pin 361 cooperates with the sliding channel.

Figure 19:
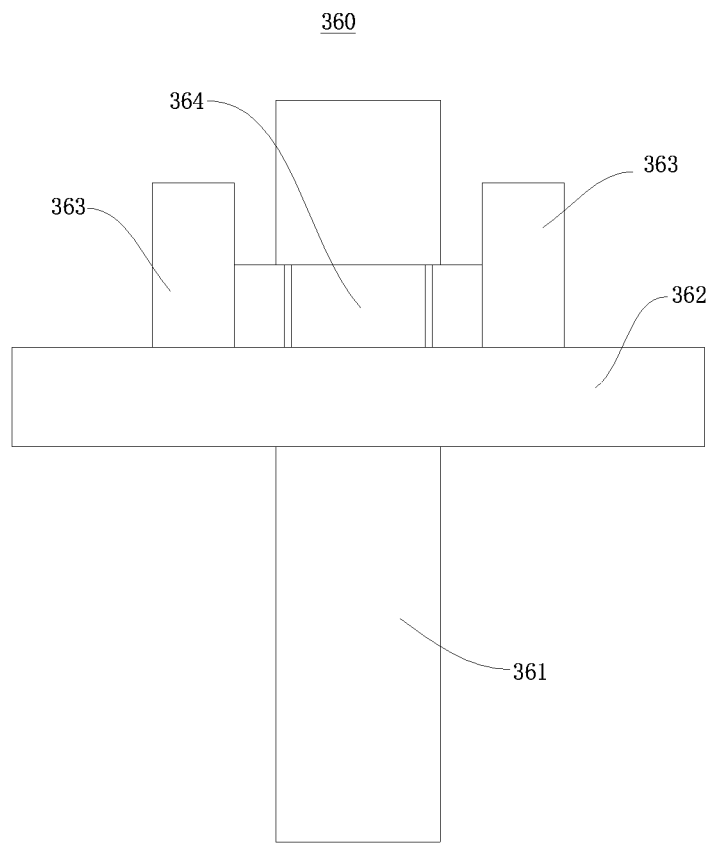
FIG. 19 is a schematic diagram of a second angle of view of a locking portion according to one embodiment of the present application.

As shown in FIG. 19, the locking portion 360 may further include a flange 362; the flange 362 is mounted on the box body 320 through a locking screw 363; the locking pin 361 is provided with a threaded section; and one end of the locking pin 361 sequentially passes through the flange 362 and the side wall of the bracket body 110 and is locked on the bracket body 110 through a locking nut 364.

In this way, after the locking portion 360 of the battery 300 moves to the predetermined position of the channel 116, the locking portion 360 may be locked in the channel 116 through cooperation between the first locking piece 131 and the second locking piece 132, so that the battery 300 is locked. When unlocking is required, limitation on the first locking piece 131 by the second locking piece 132 may be released first, so that the first locking piece 131 rotates from the locked position to an unlocked position, thereby unlocking the battery 300.

In another embodiment of the present application, the mounting base 133 may not be provided, and the first locking piece 131 and the second locking piece 132 are directly arranged on the bracket body 110.

The extension direction of the channel 116 is consistent with the gravity direction. In the process that the first connector 310 is butted with the second connector 140 in the opposite direction of the gravity direction, the locking mechanism 130 can lock the battery 300 on the bracket body 110, and locking can be realized without other operation, so that the manner and process of mounting and locking the battery 300 is simple. Furthermore, after the locking mechanism 130 unlocks the battery 300, the battery 300 is separated from the channel 116 under the action of its own gravity, and other steps of changing the battery 300 are not required, so that the change efficiency of the battery 300 is further improved.

The first locking piece 131 and the second locking piece 132 may be of any appropriate structure as long as the locking portion 360 of the battery 300 can be locked and unlocked.

Figure 20:
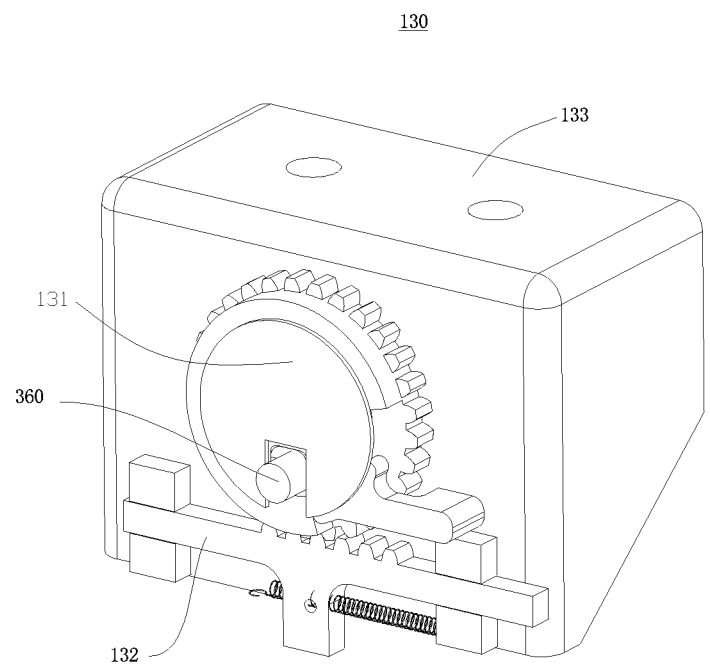
FIG. 20 is a schematic diagram of a locking portion according to another embodiment of the present application.

As shown in FIG. 20, in one embodiment of the present application, the first locking piece 131 may be a ratchet wheel, and the second locking piece 132 may be a pawl. The ratchet wheel is configured to be driven by the locking portion 360 to rotate in a first rotation direction (a clockwise direction shown in FIG. 19) in the process that the locking portion 360 moves upwards. The pawl is configured to be engaged with the ratchet wheel to prevent the ratchet wheel from rotating in a second rotation direction (an anticlockwise direction shown in FIG. 19) opposite to the first rotation direction when the locking portion 360 moves upwards to the predetermined position of the channel 116, so that the locking portion 360 is locked in the channel 116 through the ratchet wheel, and the battery 300 is locked.

In some embodiments, the cooperation between the ratchet wheel and the pawl can ensure the locking reliability on the locking portion 360 and ensure the mounting reliability on the battery 300 pack by the bracket 100. Furthermore, when it is necessary to unlock the battery 300, the pawl is separated from the ratchet wheel, which is convenient and rapid in operation.

Figure 21:
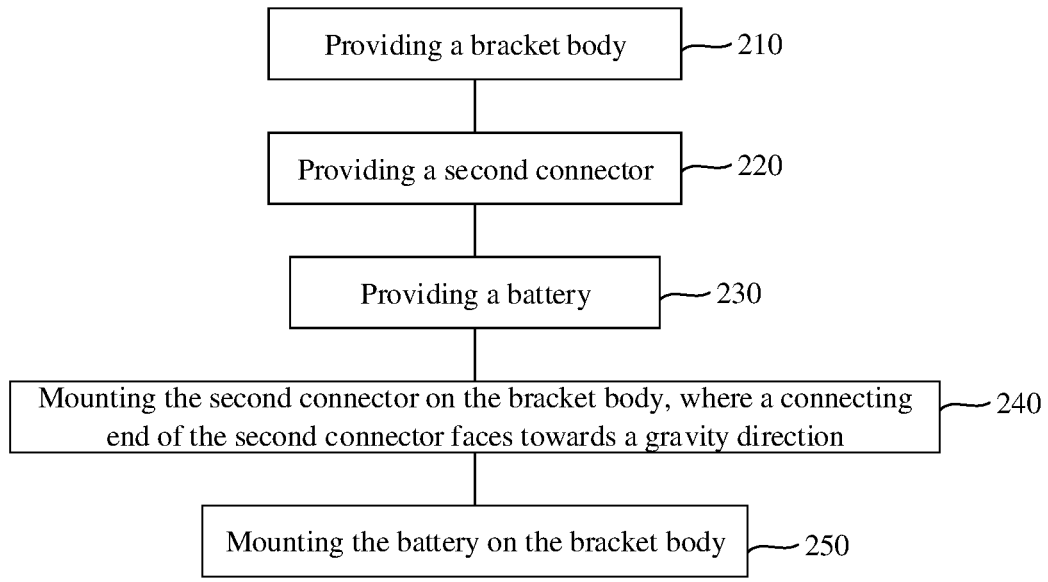
FIG. 21 is a schematic flowchart of a preparation method of a battery assembly according to one embodiment of the present application.

As shown in FIG. 21, one embodiment of the present application provides a preparation method 2 of a battery assembly. The preparation method 2 of the battery assembly includes:

210: providing a bracket body 110;
220: providing a second connector 140;
230: providing a battery 300, where the battery 300 includes a first connector 310;
240: mounting the second connector 140 on a bracket body 110, where a connecting end of the second connector 140 faces towards a gravity direction, so that a first connector 310 is capable of being butted with the second connector 140 along the opposite direction of the gravity direction, thereby realizing electric connection between the first connector 310 and the second connector 140; and
250: mounting the battery 300 on the bracket body 110, so that the first connector 310 is electrically connected to the second connector 140.

Figure 22:
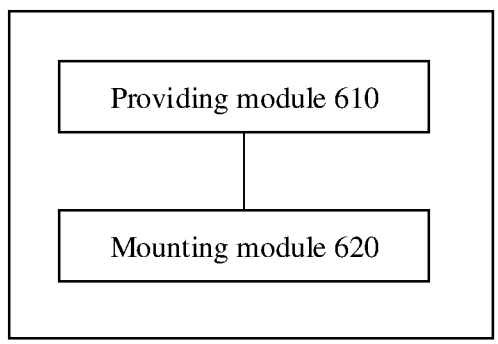
FIG. 22 is a schematic block diagram of a preparation device of a battery assembly according to one embodiment of the present application.

As shown in FIG. 22, one embodiment of the present application provides a preparation device 6 of a battery assembly. The preparation device 6 of the battery assembly includes:

a providing module 610, configured to: provide a bracket body 110, provide a second connector 140, and provide a battery 300, where the battery 300 includes a first connector 310; and a mounting module 620, configured to: mount the second connector 140 on the bracket body 110, where a connecting end of the second connector 140 faces towards a gravity direction, so that the first connector 310 is capable of being butted with the second connector 140 along the opposite direction of the gravity direction, thereby realizing electric connection between the first connector 310 and the second connector 140, and configured to: mount the battery 300 on the bracket body 110, so that the first connector 310 is electrically connected to the second connector 140.

Although the present application has been described with reference to a part of embodiments, various improvements may be made and components therein may be replaced with equivalents without departing from the scope of the present application. In particular, as long as there is no structural conflict, the technical features in the embodiments can be combined in any way. The present application is not limited to the specific embodiments disclosed herein, but can include all technical solutions falling within the scope of the claims.

What is claimed is:

1. A bracket, configured to be connected to a battery and an electric apparatus body, the battery comprising a first connector for outputting electric energy, and the bracket comprising:

a bracket body, configured to fix the battery; and a second connector, mounted on the bracket body, wherein a connecting end of the second connector faces towards a gravity direction, so that the first connector is capable of being butted with the second connector along the opposite direction of the gravity direction, thereby realizing electric connection between the first connector and the second connector;

wherein the connecting end of the second connector comprises a terminal; the terminal is configured to be butted with the first connector to realize electric connection between the terminal and the first connector; and the terminal extends in the gravity direction the second connector further comprises a base, a first lead and a second lead; the connecting end of the second connector is fixed on the base; the terminal includes a first terminal and a second terminal with opposite polarities; one end of the first lead is connected to the first terminal; one end of the second lead is connected to the second terminal; and the first lead and the second lead respectively stretch out towards two opposite sides of the base in a first direction, the first direction being perpendicular to the gravity direction.

2. The bracket according to claim 1, wherein the first lead and the second lead are at least partially located in the base; a first wire outlet hole and a second wire outlet hole are formed in the two opposite sides of the base in the first direction respectively; the first lead stretches out of the first wire outlet hole; and the second lead stretches out of the second wire outlet hole.

3. The bracket according to claim 2, wherein a center line of the first wire outlet hole coincides with a center line of the second wire outlet hole.

4. The bracket according to claim 1, wherein an interval exists between the first terminal and the second terminal in the first direction.

5. The bracket according to claim 1, wherein a size of the base in the first direction is greater than that of the base in a second direction, and the first direction, the second direction and the gravity direction are perpendicular to each other.

6. The bracket according to claim 1, wherein the second connector is mounted on the bracket body in a floating manner.

7. The bracket according to claim 1, wherein the bracket body comprises a first beam, a second beam and a fixing frame; the first beam and the second beam are arranged oppositely; an accommodating space for accommodating the battery is formed between the first beam and the second beam; the fixing frame is connected to the first beam and/or the second beam; and the second connector is mounted on the fixing frame.

8. The bracket according to claim 7, wherein the fixing frame is U-shaped, and two ends of the fixing frame are connected to the first beam and the second beam respectively.

9. The bracket according to claim 7, wherein the bracket body further comprises at least one third beam, and each third beam is connected to the first beam and the second beam.

10. The bracket according to claim 7, wherein there are two first beams; the two first beams are arranged oppositely; the second beam is located between the two first beams, so that the bracket forms two accommodating spaces; and each of the accommodating spaces is correspondingly provided with at least one second connector.

11. The bracket according to claim 1, wherein the bracket further includes: a locking mechanism; and the locking mechanism is mounted on the bracket body and is configured to lock the battery in the bracket body.

12. The bracket according to claim 11, wherein the battery is provided with a locking portion; the bracket body is provided with a channel extending in the gravity direction; the channel extends to a lower surface of the bracket body, so that the locking portion can enter and exit the channel;

the locking mechanism is configured to lock the locking portion when the locking portion moves upwards to a predetermined position of the channel; and the locking mechanism is configured to unlock the locking portion, so that the locking portion moves downwards under the gravity action of the battery to be separated from the channel.

13. A battery assembly, comprising:

a bracket, the bracket configured to be mounted on the electric apparatus body; and a battery mounted on the bracket and comprising a first connector;

the bracket comprising:

a bracket body, configured to fix the battery; and a second connector, mounted on the bracket body, wherein a connecting end of the second connector faces towards a gravity direction, so that the first connector is capable of being butted with the second connector along the opposite direction of the gravity direction, thereby realizing electric connection between the first connector and the second connector;

wherein the connecting end of the second connector comprises a terminal; the terminal is configured to be butted with the first connector to realize electric connection between the terminal and the first connector; and the terminal extends in the gravity direction the second connector further comprises a base, a first lead and a second lead; the connecting end of the second connector is fixed on the base; the terminal includes a first terminal and a second terminal with opposite polarities; one end of the first lead is connected to the first terminal; one end of the second lead is connected to the second terminal; and the first lead and the second lead respectively stretch out towards two opposite sides of the base in a first direction, the first direction being perpendicular to the gravity direction.

14. The battery assembly according to claim 13, wherein the first connector comprises a first guide portion; the second connector comprises a second guide portion; the second guide portion is configured to cooperate with the first guide portion so as to guide the second connector to be aligned with the position of the first connector when the second connector is butted with the first connector.

15. The battery assembly according to claim 14, wherein one of the first guide portion and the second guide portion is a guide sleeve, and the other one is a guide column.

16. The battery assembly according to claim 14, further comprising a first sealing piece, wherein when the second guide portion cooperates with the first guide portion in place, the first guide portion and the second guide portion are sealed through the first sealing piece.

17. The battery assembly according to claim 16, wherein one of the first guide portion and the second guide portion is a guide sleeve, and the other one is a guide column; and
when the guide sleeve cooperates with the guide column in place, an end face of the guide sleeve and a connector where the guide column is located are sealed by the first sealing piece.

18. An electric apparatus, comprising:
an electric apparatus body; and
a battery assembly, wherein the bracket of the battery assembly is mounted on the electric apparatus body; the battery assembly comprising:
  a bracket, the bracket configured to be mounted on the electric apparatus body; and
  a battery mounted on the bracket and comprising a first connector;
the bracket comprising:
  a bracket body, configured to fix the battery; and
  a second connector, mounted on the bracket body, wherein a connecting end of the second connector faces towards a gravity direction, so that the first connector is capable of being butted with the second connector along the opposite direction of the gravity direction, thereby realizing electric connection between the first connector and the second connector;
wherein the connecting end of the second connector comprises a terminal; the terminal is configured to be butted with the first connector to realize electric connection between the terminal and the first connector; and the terminal extends in the gravity direction
the second connector further comprises a base, a first lead and a second lead; the connecting end of the second connector is fixed on the base; the terminal includes a first terminal and a second terminal with opposite polarities; one end of the first lead is connected to the first terminal; one end of the second lead is connected to the second terminal; and the first lead and the second lead respectively stretch out towards two opposite sides of the base in a first direction, the first direction being perpendicular to the gravity direction.

* * * * *